United States Patent [19]

Fields et al.

[11] 3,846,543
[45] Nov. 5, 1974

[54] PROCESS FOR THE SEPARATION OF VIRUS FROM NON-VIRAL PROTEINS

[75] Inventors: Joseph E. Fields, Ballwin; John H. Johnson, Kirkwood, both of Mo.

[73] Assignee: Monsanto Company, St. Louis, Mo.

[22] Filed: Aug. 2, 1971

[21] Appl. No.: 168,390

Related U.S. Application Data

[60] Division of Ser. No. 829,146, May 29, 1969, Pat. No. 3,655,509, which is a continuation-in-part of Ser. No. 777,409, Nov. 20, 1968, abandoned, which is a continuation-in-part of Ser. No. 590,127, Aug. 19, 1966, abandoned, which is a division of Ser. No. 440,991, March 18, 1965, abandoned, which is a continuation-in-part of Ser. No. 248,881, Jan. 2, 1963, abandoned.

[52] U.S. Cl. ................................ 424/89, 195/1.5
[51] Int. Cl. ........................................... C12k 5/00
[58] Field of Search ................. 424/89, 79; 195/1.5

[56] References Cited
UNITED STATES PATENTS
3,214,340  10/1965  Laurence ............................ 424/89

OTHER PUBLICATIONS

American Drug Index, published by J. B. Lippincott Co., Phila., 1962, page 606.

Primary Examiner—Richard L. Huff

[57] ABSTRACT

Viruses are selectively separated from an aqueous mixture of virus and nonviral protein by contacting the aqueous mixture with a water-insoluble polyelectrolyte polymer containing basic groups to selectively sorb the virus on the polymer and then if desired removing the polymer containing the virus from the aqueous mixture. The polyelectrolyte polymers are polycationic or polyampholytic in nature and contain imide groups selected from the group consisting of diloweralkylaminoloweralkylimide groupings and loweralkyliminodi(loweralkylimide) linkages as exemplified by crosslinked dimethylaminopropylimide derivatives of isobutylene/maleic anhydride copolymers.

15 Claims, No Drawings

PROCESS FOR THE SEPARATION OF VIRUS FROM NON-VIRAL PROTEINS

CROSS-REFERENCE TO RELATED APPLICATIONS

This application is a division of Ser. No. 829,146, filed May 29, 1969, now U.S. Pat. No. 3,655,509; which is a continuation-in-part of Ser. No. 777,409, filed Nov. 20, 1968, now abandoned; which is a continuation-in-part of Ser. No. 590,127, filed Aug. 19, 1966, now abandoned; which is a division of Ser. No. 440,991, filed Mar. 18, 1965, now abandoned; which is a continuation-in-part of Ser. No. 248,881, filed Jan. 2, 1963, now abandoned.

BACKGROUND OF THE INVENTION

1. Field of the Invention

This invention relates to a process for the selective separation of virus from an aqueous mixture containing virus and nonviral protein.

2. Description of the Prior Art

Viral substances have been removed from various aqueous mixtures of virus and nonviral protein by sorbing the virus on a sorbant for the virus and separating the sorbed virus from the aqueous mixture. As one example, virus has been separated from sewage by contacting the sewage with aluminum hydroxide to adsorb the virus on the aluminum hydroxide and then removing the aluminum hydroxide containing the adsorbed virus from the sewage. Likewise virus has been removed from vaccine preparations containing foreign (non-viral) protein by adsorbing the virus on aluminum phosphate and removing the aluminum phosphate containing the adsorbed virus from the vaccine preparation. The above procedures using aluminum salts are generally inefficient and possess many disadvantages. Principal among these disadvantages is that they permit at best only partial separation of virus from non-viral protein due to poor selectivity for virus of the adsorbants. Also, they lack effectiveness in selectively removing small amounts of virus from large quantities of aqueous media, such as sewage.

The surprising discovery has now been made that certain water-insoluble polyelectrolytes containing a particular type of imide will preferentially adsorb viruses contained in harvests, e.g., harvests of virus-infected tissue cultures or harvests of virus-infected chicken or duck embryo. Once the viruses are absorbed to the polyelectrolytes (PEs), the fluids containing the non-viral protein are discarded, and the viruses are concentrated on the PEs the viruses are then eluted therefrom to yield virus suspensions free of non-viral proteins. The total volume of fluids used to elute the viruses from the PE can be so predetermined as to concentrate the viruses 10X or 100X, thereby yielding virus preparations of high purity and in concentrated form.

According to the invention, such preparations can now be used for vaccines, either live, attenuated or killed as the case may be.

The efficient killing of viruses by reagents such as formalin is effected by the presence of organic components derived from the virus harvest, since such organic materials interfere with the activity of formalin. Thus, in working with conventional virus harvests, the killing of viruses present therein by treatment with formalin requires a prolonged period of incubation (3 to 4 days) at 37° C, before 100 percent virus inactivation is effected. Under these conditions, a large amount of thermal inactivation takes place along with the formalin inactivation, and the 37°C temperature also renders non-antigenic a large portion of the virus antigen originally present in the virus harvest. By use of purified virus preparations as described in this application, formalinization proceeds expeditiously, requiring only several hours at 37°C for inactivation of the virus population; the time during which the preparation is subject to thermal inactivation is hence greatly reduced. Furthermore, since according to the invention described herein the virus is eluted, as by a salt solution, and since experimental results have shown that chiefly nitrogenous matter of virus origin is recovered in the eluate, use of these purified concentrates is clearly advantageous for the preparation of killed or live virus vaccines.

Originally, and currently, virus vaccines have been and are being prepared in the chicken or cuck embryonated egg. Also, since the introduction of tissue culture procedures, many virus vaccines are being prepared in cultures of a variety of cells originating from simian, human, canine, avian, and rodent sources. As an example, chicken and duck embryonated eggs, when used to grow viruses, are harvested by obtaining embryonic fluids and organs containing the virus. Thus, the harvest contains not only virus, but also many proteinaceous substances from the host. Since a major portion of the harvest consists of non-viral proteins, the injection of vaccines made from such materials will elicit a response in man or animals not only to the virus but also to the many assorted non-viral proteins. Under such conditions, these extraneous foreign non-viral proteins will in many cases sensitize man and animals, and subsequent re-injections of similar materials may lead to untoward reactions, and even to fatal anaphylactic shock.

Similarly, virus harvests made in tissue cultures will contain, besides the virus, an assortment of proteins derived from the medium used to maintain such cultures, and also cellular proteins released when cell lysis takes place during virus replication, or when the cells are disrupted by laboratory procedures to release intracellular virus. The administration of such preparations subjects the vaccine to foreign, sensitizing proteins as described above.

In addition to the problem of foreign proteins, vaccine preparations are only as effective as the antigenicity of the viruses present therein. An important factor in the antigenicity of a virus vaccine is the number of virus particles present. Thus, virus vaccines containing low numbers of virus particles may be inefficient as immunizing agents. Therefore the concentration of virus preparations, to yield viral particles in sufficient numbers to contain an adequate concentration of immunizing antigens, is a desirable improvement in vaccine production.

It is, therefore, desirable to provide an improved process whereby virus can be selectively and efficiently removed from an aqueous mixture containing virus and a non-viral protein.

SUMMARY OF THE INVENTION

The present invention resides in the discovery that virus is selectively separated from an aqueous mixture of virus and non-viral protein by contacting the aqueous mixture with a water-insoluble polyelectrolyte polymer, containing basic groups, hereinafter sometimes referred to as basic polyelectrolyte polymer, thereby selectively sorbing virus on the polymer and then if desired separating the polymer containing the virus from the aqueous mixture. The polyelectrolyte polymer is polycationic or polyampholytic in nature and contains imide groups selected from the group consisting of diloweralkylaminoloweralkylimide groupings and loweralkyliminodi(loweralkylimide) linkages. After separation of the polymer containing the sorbed virus from the aqueous mixture, the virus itself may if desired be recovered from the polymer, as for example, by elution with a salt.

DETAILED DESCRIPTION OF THE INVENTION

The basic polyelectrolyte polymer used in the present invention is water-insoluble. Many of the normally water soluble polyelectrolyte polymers are converted to the water-insoluble form by introduction of sufficient crosslinks in known manner. Crosslinking may be accomplished either during preparation of the polymer or by subsequent treatment of the polymer to make the polymer insoluble in water. Typical crosslinking agents include divinylbenzene, ethylene diamine and methyliminobispropylamine. Other crosslinking agents are known from U.S. Pat. No. 3,165,486. When methyliminobispropylamine or other loweralkyliminobis-loweralkylamine is employed as the cross-linking agent, loweralkyliminodi(loweralkylimide) linkages are introduced into the polymer. The water insolubility of the polymer can be varied by regulation of the degree of cross-linking of the polymer. The term "water-insoluble" as used herein is taken to mean that the polymer concerned does not dissolve in water or aqueous solution even though it may have such characteristics as a high degree of swelling due to solvation by water, even to the extent of existence in a gel form. Such characteristics are typically imparted by crosslinking.

By "polyelectrolyte," it is intended to include only polymeric organic substances which when contacted with an aqueous medium or aqueous alkaline or aqueous acidic medium possess organic ions having electrical charges distributed at a plurality of positions thereon.

Copolymers herein are frequently conveniently identified in terms of their monomeric constituents. The names so applied refer to the molecular structure and are not limited to the polymers prepared by the copolymerization of the specified monomers. In many instancces the identical copolymers may be prepared from other monomers and converted by subsequent chemical reaction to the desired copolymer.

Polyelectrolyte polymers which are preferred for use in the present invention are basic water-insoluble polymeric polyelectrolytes selected from the group consisting of (A) a polymerized unsaturated carboxylic acid or anhydride and an imide derivative of a polymerized unsaturated carboxylic acid or anhydride (B) an imide derivative of a polymerized unsturated carboxylic acid or anhydride and (C) a copolymer of (1) an unsaturated monomer having, for example, 2 to 30 carbon atoms and (2) a monomer selected from the group consisting of (a) an unsaturated carboxylic acid or anhydride and an imide derivative of an unsaturated carboxylic acid or anhydride and (b) an imide derivative of an unsaturated carboxylic acid or anhydride. Preferably the polyelectrolyte polymer has an average molecular weight of at least 1000 and a degree of polymerization of at least 8. The polyelectrolyte polymer contains imide groups as diloweralkylaminoloweralkylimide groupings or as loweralkyliminodi(loweralkylimide) linkages. It is preferred that the polymer, that is, the reactive sites in the polymer, contain a substantial number (e.g., 2-100 percent) of diloweralkylaminoloweralkylimide groups.

The polyelectrolyte polymer may advantageously by an EMA-type polymer.

Among the EMA-type polymers suitable for the practice of the present invention are polymeric polyelectrolytes subject to the previously noted requirements having units of the formula

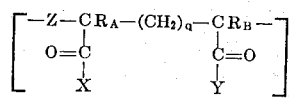

wherein: $R_A$ and $R_B$ are selected from the group consisting of hydrogen, halogen (preferably chlorine), alkyl of 1 to 4 carbon atoms (preferably methyl), cyano, phenyl, or mixtures thereof; provided that not more than one of $R_A$ and $R_B$ is phenyl; Z is a bivalent radical (preferably alkylene, phenylalkylene, alkoxyalkylene, and aliphatic acyloxyalkylene) of 1 to 18 carbon atoms, preferably a bivalent carbon chain of 1 to 4 carbon atoms inclusive, which is a part of a unit containing 1–18 carbon atoms, inclusive, q is zero or one, X and Y are selected from hydroxy, $-O$ alkali metal, OR, $-OH-NH_3$, $-OH-R_3N$, $-OH-R_2NH$, $-OH-RNH_2$, $-NRR'$, $-(Q)_p-W-(NRR'R')_x$ and $-(Q)_p-W-(-OH)_x$, wherein $x$ is 1 to 4 and $p$ is zero or one, wherein R is selected from the group consisting of alkyl, phenylalkyl or phenyl, the alkyl group containing 1–18 carbon atoms, wherein $R'$ is H or R, wherein Q is oxygen or $-NR'-$, and wherein W is a bivalent radical preferably selected from alkylene, phenylene and phenylalkene having up to 20 carbon atoms, X and Y taken together can be oxygen or $-NR-$, $-N-W-(NR'R')_x$ or $-N-W-(NR'R'R'')_x^+$ wherein R, W, $R'$ have the meanings previously assigned and $R''$ is alkyl of 1 to 18 carbon atoms, benzyl or aromatic-substituted benzyl. The units of the formula given above are recurring, $n$ being at least 8 and can be as much as 100,000 degrees of polymerization. When the units are requiring the symbols in the various recurring units do not necessarily stand for the same thing in all of the recurring units.

Many of these polymers suitable for the practice of the present invention or suitable after conversion to derivatives are commercially available. Such polymers containing the requisite imide groups are water-insoluble and polycationic or polyampholytic in nature.

The polycarboxylic acid polymers can be of the non-vicinal-type including those containing monomer units, such as acrylic acid, acrylic anhydride, methacrylic acid, crotonic acid or their respective derivatives, including partial salts, amides and esters or of the vicinal type, including maleic, itaconic, citraconic, a-dimethyl maleic, a-butyl maleic, a-phenyl maleic, fumaric, aconitic, a-chloromaleic, a-bromomaleic, a-cyanomaleic acids including their salts, amides and esters. Anhydrides of the forgoing acids are also advantageously employed.

Co-monomers suitable for use with the above polycarboxylic acid monomers include a-olefins, such as ethylene, 2-methyl-pentene-1, propylene, butylene, 1-or 2-butene, 1-hexene, 1-octene, 1-decene, 1-dodecene, 1-octadecene, and other vinyl monomers, such as styrene, a-methyl styrene, vinyltoluene, vinyl acetate, vinyl chloride, vinyl formate, vinyl alkyl ethers, e.g., methylvinylether, alkyl acrylates, alkyl methacrylates, acrylamides and alkyl-acrylamides, or mixtures of these monomers. Reactivity of some functional groups in the copolymers resulting from some of these monomers permits formation of other useful functional groups in the formed copolymer, including hydroxy, lactone, amine and lactam groups.

Any of the said carboxylic acids or derivatives may be copolymerized with any of the other monomers described above, and any other monomer which forms a copolymer with carboxylic acids or derivatives. Although these copolymers can be prepared by direct polymerization of the various monomers, frequently they are more easily prepared by an after-reaction modification of an existing copolymer. copolymers are conveniently identified in terms of their monomeric constituents. The names so applied refer to the molecular structure and are not limited to the polymers prepared by the copolymerization of the specific monomers.

The initial copolymers of anhydrides and another monomer can be converted to carboxyl-containing copolymers by reaction with water, and to ammonium, alkali and alkaline earth metal and alkylamine salts thereof by reaction with alkali metal compounds, alkaline earth metal compounds, amines or ammonia. Other suitable derivatives of the above polymers include the alkyl or other esters and amides, alkyl amides, dialkyl amides, phenylalkyl amides or phenyl amides prepared by reacting carboxyl groups on the polymer chain with the selected amines or alkyl or phenylalkyl alcohol, as well as amino esters, amino amides, hydroxy amides and hydroxy esters, wherein the functional groups are separated by alkylene, phenyl, phenylalkyl, phenylalkylphenyl, or alkylphenylalkyl or other aryl groups. Moieties bearing amine or amine salts including quaternary salt groups are conveniently formed by reaction of the carboxyls of their anhydride precursors, where applicable with polyfunctional amines such as dimethylaminopropylamine at higher temperatures forming an imide linkage with vicinal carboxyls. Such pendant free amine groups can then be converted, if desired, to their simple or quaternary salts.

Representative EMA-type carboxylic acid or anhydride-olefin polymers, especially maleic acid or anhydride-olefin polymers of the foregoing type are known, for example, from U.S. Pat. Nos. 2,378,629; 2,396,785; 3,157,595; and 3,340,680. Generally, the copolymers are prepared by reacting ethylene or other unsaturated monomer, or mixtures thereof, with the acid anhydride in the presence of a peroxide catalyst in an aliphatic or aromatic hydrocarbon solvent for the monomers but nonsolvent for the interpolymer formed. Suitable solvents include benzene, toluene, xylene, chlorinated benzene and the like. While benzoyl peroxide is usually the preferred catalyst, other peroxides such as acetyl peroxide, butyryl peroxide, ditertiary butyl peroxide, lauroyl peroxide and the like, or any of the numerous azo catalysts, are satisfactory since they are soluble in organic solvents. The copolymer preferably contains substantially equimolar quantities of the olefin residue and the anhydride residue. Generally, it will have a degree of polymerization of 8 to 100,000, preferably about 100 to 5,000, and a molecular weight of about 1,000 to one million, preferably about 10,000 to 500,000. The properties of the polymer, such as molecular weight, for example, are regulated by proper choice of catalyst and control of one or more of the variables such as ratio of reactants, temperature, and catalyst concentration or the addition of regulating chain transfer agents, such as diisopropyl benzene, propionic acid, alkyl aldehydes, or the like. Numerous of these polymers are commercially available.

Derivatives containing basic groups can be prepared by any convenient procedure. Representative derivatives of polymers employed in the present invention are known to the art, for example, from U.S. Pat. No. 3,398,092. As already indicated at least a portion of the basic groups are diloweralkylaminoloweralkylimide groupings or loweralkyliminodi(loweralkylimide) linkages. Such products are further illustrated by the following preparations and examples.

Partial imides of a starting carboxyl or carboxylic acid anhydride containing polymer, e.g., EMA, are produced by:

A. Heating a limiting amount of a secondary or tertiary aminoloweralkylamine with the anhydride or carboxyl-containing form of the polymer in a suitable solvent (e.g., xylene) at a temperature of about 140°–150° C. until water is no longer given off. Such a reaction simultaneously results in formation of imide groups in proportion to the amount of amine added and in the reformation of anhydride groups for the remainder of the polymer units. In this manner, imide-polymer products are formed which typically possess 2–100 percent imide groupings, the remaining carboxyl groups, when present, being in the anhydride form.

B. Alternatively, a partial amide polymer product may be converted to the partial imide polymer product by heating a partial amide polymer product in vacuo at 140°–150° C until water is no longer given off. Such an imide polymer product likewise possesses comparable proportions of imide and anhydride groups depending upon the number of amide groups originally contained in the starting partial amidepolymer product.

Partial secondary or tertiary aminoloweralkylamides of the starting carboxyl or carboxylic acid anhydridecontaining polymer, e.g., EMA, are obtained by contacting the polymer with a limiting amount of the selected amine in suspension in a solvent such as benzene or hexane, resulting in formation of a partial amide-acid-anhydride derivative of the polymer, or a correspnding amide-carboxylate derivative thereof. The number of amide groups is dependent upon the quantity of the amide used as compared with the quantity of polymer employed. Such amidepolymer products typically comprise 2–100 percent amide groups, with remaining carboxyl groups being present as acid or anhydride groups.

Suitable blocking and unblocking of the amide moiety of the reactant employed in preparing amide or imides may be effected when required. Residual, nonmodified, polymer units may optionally be converted to neutral groups or units by attachment to the polymer molecule of compounds including alkylamines, aminoalcohols, and alcohols.

Alternatively, additional cationic character can be provided in the polymer through incorporation of monomers which impart a basic or cationic character such as C-vinyl pyridines, vinyl amine, the several amino-substituted vinyl benzenes (or toluenes, etc.), amine-bearing acrylates (or methacrylates, etc.), vinyl imidazole, etc.

Thus, in any event, the polymer product will have residual active or reactive groups which may be of various types including mixtures, but these residual active or reactive groups or residual "reactive sites" in the polymer will in one way of another comprise a certain percentage which are of a basic nature, so as to impart the requisite basic nature to the polymer product.

Especially preferred polymer subject to the previously referred to requirements are selected from the group consisting of ethylene/maleic acid or anhydride copolymers, styrene/maleic acid or anhydride copolymers, methylpentene/maleic acid or anhydride copolymers, and isobutylene/maleic acid or anhydride copolymers.

As will be apparent from the foreging, the essential basic groups of the polycationic or polyampholytic polyelectrolyte (PE) employed are of an imide nature, involving diloweralkylaminoloweralkylimide groupings, as produced by reacting a diloweralkylaminoloweralkylamine with the carboxyl groups of a pre-formed polymer or by polymerizing an unsaturated olefin with an unsaturated anhydride or acid having such preformed imide groups in at least a portion of the unsaturated polycarboxylic acid reactant. According to the invention, such groups are preferred for purposes of the invention. Alternatively, whether such groups are or are not present, imide groups may be provided by crosslinking the polymer with a loweralkyliminobis (loweralkylamine), which is the process of crosslinking by reaction between the terminal amine group of the crosslinker and carboxyl groups in the polymer chain is productive of imido groups at both ends of the crosslinking chain with formation of the desired loweralkyliminobis(loweralkylimide) linkages. Also, diloweralkylaminoloweralkyl ester groups may be present, as well as other groups, so long as the prescribed percentages of imde groups of the prescribed type are also present in the PE-molecule as well as the residual acid groups of the starting unsaturated acid or anhydride when the PE is a polyampholyte. As will be recognized, both the acid groups and the imide groups need not necessarily be present in the PE as such, but may be present in the form of their simple derivatives, e.g., salts, as already indicated.

One application of the process of the present invention is the selective removal of virus from virus harvests of even relatively impure preparations containing non-viral protein contaminants.

Another application of the process of the present invention is the detection and removal of virus in pooled blood supplies.

Another application of the process of the present invention is the separation of antibodies from unassociated virus (antigens).

Another application of the process of the present invention is the detection and removal of virus from sewage. The importance of this aspect of the invention is readily apparent from the fact that may viral diseases are spread by contamination of water into which sewage has been discharged. The process of the present invention is especially advantageous in removing virus from hospital wastes prior to discharge of such sewage wastes to a public sewer system.

Various procedures for application of the waterinsoluble polyelectrolyte polymers (PEs) to effect selective separation of virus from an aqueous mixture containing virus and non-viral protein may be employed and will be apparent to one skilled in the art. The present invention is not limited to any particular manner of contacting the aqueous mixture containing the virus and non-viral protein.

In carrying out the process of the present invention, the polyelectrolyte polymer can be added to the aqueous mixture with agitation for a period of time sufficient to selectively sorb the virus and then the polymer containing the sorbed virus can be separated from the aqueous mixture by any suitable procedure, as for example, by filtration. Such procedure is especially advantageous when small volumes of aqueous mixture are involved. Sometimes separation is not necessary for removal, as in filter type or other flow through applications. However, even in such type operations, the adsorbent PE will have to be removed ultimately for recharging or replacement.

In such alternate procedure the aqueous mixture can be passed through a bed or a column of the polyelectrolyte polymer. In the case of sewage wastes in which large quantities of fluids are involved, the sewage can be passed through a packed bed or column containing the polyelectrolyte polymer and, if desired, a coagulant or flocculent.

Efficient sorbtion is effectd at room or even lower temperatures; accordingly elevated temperatures are not required to effect satisfactory viral adsorption.

The effectiveness of a particuar PE in adsorbing a particular virus to the substantial exclusion of non-viral protein is particularly related to the pH of the aqueous medium and the isoelectric pH (IEpH) of each of the PE, the virus, and the non-viral protein, as will become more readily apparent hereinafter. Determination of the IEpH of the above mentioned species is within the skill of the art. IEpH of representative PEs has been determined in isotonic (0.15M) saline and is given in Table 1 immediately following. The IEpH values were obtained at equilibrium conditions by interpretation of potentiomeric pH titration experiments.

TABLE 1

| | % Dimethylaminopropylimide | IE pH |
|---|---|---|
| Ethylene/Maleic Anhydride Copolymer | 2* | 3.10 |
| | 5 | 4.01 |
| | 10 | 3.98 |
| | 15 | 4.00 |
| | 20 | 4.46 |
| | 30 | 4.90 |
| | 50 | 5.87 |
| | 70 | 8.54 |
| | 100 | 10.30 |
| Isobutylene/Maleic Anhydride Copolymer | 5 | 2.65 |
| | 10 | 2.64 |
| | 15 | 2.73 |
| | 20 | 3.05 |
| | 30 | 3.75 |

TABLE 1-Continued

| | % Dimethylaminopropylimide | IE pH |
|---|---|---|
| | 50 | 7.68 |
| | 70 | 8.13 |
| | 100 | 9.20 |
| Styrene/Maleic Anhydride Copolymer | 5 | 2.96 |
| | 10 | 2.95 |
| | 15 | 3.48 |
| | 20 | 3.62 |
| | 30 | 3.79 |
| | 50 | 5.85 |
| | 70 | 7.76 |
| | 100 | 9.63 |
| 2-Methyl Pentene-1/ Maleic Anhydride Copolymer | 5 | 3.13 |
| | 10 | 3.40 |
| | 15 | 4.00 |
| | 20 | 4.87 |
| | 30 | 6.70 |
| | 50 | 7.98 |
| | 70 | 8.15 |
| | 100 | 8.82 |

* methyliminobis (propylimino) linkages

After removal of the polymer containing the sorbed virus from the aqueous mixture, the virus may be eluted from the polymer if desired. The elution may be carried out by any suitable procedure, for example, it is convenient to add the polymer containing the sorbed virus to a suitable eluant and allow the mixture to stand for a period of time sufficient to effect elution. To shorten the elution time it is desirable to agitate the mixture, for example, by shaking or stirring.

The selection of a suitable eluant will depend among other things principally upon the particularly polyelectrolyte employed and the particular virus to the eluted. Generally, it has been found that elution is more readily effected when the percent imide content of polyelectrolyte is at least 5 percent and is present in the form of diloweralkylaminoloweralkylimide groups. Any suitable eluant may be employed. Suitable eluants include aqueous protein mixtures containing proteins that will exchange for the virus, for example, calf fetal serum. Buffered solutions, for example, borate buffer and phosphate buffer, are also conveniently used as eluants. Aqueous solutions containing excess hydroxy ions for example, aqueous solutions of alkali metal and alkaline earth metal hydroxides may be employed. Solutions of greater ionic strength than the solution from which adsorption is effectd, such as salt solutions, may also be employed to advantage for elution. Solutions containing surface active agents also serve as suitable eluants.

A particular advantage of the present invention is that effective elution may be accomplished using a volume of eluant much smaller than the volume of the original liquid medium from which the virus is selectively removed, thereby permitting concentration of the virus in the eluate.

If desired further concentration of the virus can be readily obtained by removing the polyelectrolyte from the eluate containing the virus and adding to the eluate a polyelectrolyte which sorbs the virus from the particular eluate employed at least under selected pH conditions. The polyelectrolyte containing the sorbed virus is then removed from the eluate and the resorbed virus eluted using an eluant suitable to elute the particular virus from the particular polyelectrolyte. This procedure is especially advantageous in the preparation of a purified virus suitable for use in vaccine preparations for immunization of a living animal body against viral disease. As usual, a column, bed or other flowthrough procedure may frequently be advantageously employed for both the sorbtion and the elution.

The process of the present invention is applicable to both plant and animal viruses. Such viruses include virus of the RNA-protein capsid type, for example, poliomyelitis virus, coxsackle virus and echo-7 virus, those of the RNA-lipid envelope type, such as measles virus, those of the DNA-protein capsid type such as virus SV-15, and those of the DNA-lipid envelope type such as vaccinia virus and herpes virus.

Specific viruses which can be processed, concentrated and purified from non-viral protein according to the invention, thereby to enhance their antigenicity, include, for example, types 2 and 3 poliovirus, Sindbis virus, rhinovirus, echovirus types 1, 2, 6, 9 and 11; coxsacklevirus types A9, B1, B2, B3 and B5; influenza virus types A and B, measles virus, vaccinia virus and herpes virus.

The following Preparations and Examples are given by way of illustration only and are not to be construed as limiting the invention.

Preparation 1

This preparation illustrates the preparation of a typical maleic acid/$C_2$-$C_{12}$ monoolefin copolymer useful in the preparation of active adsorbent derivatives. A 3-liter glass reactor, fitted with reflux condenser and motor-driven stirring device was charged with 52.3 g of maleic anhydride, 55.7 g of styrene, 1500 ml of benzene, 2.53 g of 55 percent active divinyl benzene, equivalent to 1.39 g, or 1 mol percent of active cross-linking agent, and 0.275 g of benzoyl peroxide. The reactants are heated to the temperature of refluxing benzene and maintained at this temperature with good mixing for 3.5 hours. The polymers was filtered, washed upon the filter with benzene and finally dried in the vacuum oven for 16 hours at 100°C. An essentially quantitative yield of cross-linked styrene/maleic anhydride copolymer was obtained.

Preparation 2

A predetermined percentage of anhydride groups in the maleic anhydride copolymer, such as prepared in Preparation 1, can be converted to substituted imide groups by a simple two-step process. To prepare a product containing 50 percent imide linkages, 0.5 molar unit of styrene/maleic anhydride polymer from Preparation 1, was charged to a glass 1 liter reactor fitted with mechanical stirrer and graduated water trap topped by a reflux condenser. The reactor was then charged with 500 ml dry xylene and 0.25 mol of a dialkylaminoalkylamine added. A representative amine of this class is the dimethylaminopropylamine. As the reactants were gently warmed with good mixing, the anhydride linkage was opened and the N-substituted amide formed. Heating was continued and the temperature raised to reflux the xylene and to carry off azeotropically the water of reaction as the imide linkages formed.

After the theoretical quantity of water had been distilled from the reactor, the solvent was stripped off under reduced pressure and the product copolymer derivative dried in a vacuum oven.

Preparation 3

The copolymer from Preparation 2 containing 50 percent substituted imide linkages is suitable for use in the present invention. For certain applications a copolymer having a percentage of quaternary salt hydrophilic gropus can be prepared by reacting the substituted imide with an alkyl halide. It is possible to convert a calculated proportion of the tertiary nitrogen atoms to quaternary nitrogen atoms by the simple method of warming a suspension of the polymer with a calculated amount of alkyl halide. An inert diluent such as benzene can be employed for the preparation of the quaternary ammonium derivatives. A calculated weight of the imide substituted copolymer, as prepared in Preparation 2, was suspended in benzene to which was added an alkyl halide. The reaction proceeded readily at temperatures from 40° to 60° C when a halide such as methyl iodide was employed. A reaction period of 30 minutes or less is usually sufficient when an active halide such as a benzyl halide or a lower alkyl halide is employed. If the halide be a chloride, the reaction time is somewhat longer than if the halide portion of the molecule be bromide or iodide. After the heating period was completed, the diluent was stripped off at reduced pressure and the polymer dried in a vacuum oven.

Preparation 4

The hydrophilic properties of the various copolymers suitable for the practice of our invention can be increased by an ammoniation step. Ammonia gas is used to convert unreacted anhydride linkages in the copolymer to the halfamide, half-ammonium salt. This reaction can be carried out by adding ammonia to the dry polymer while using thorough mixing, or the ammonia can be added to a suspension of the copolymer in an inert diluent such as benzene. The ammoniation step has been successfully conducted using copolymer as prepared, or can be carried out with a derivative of the copolymer, e.g., copolymer containing imide linkages, copolymer containing substituted imide linkages, or copolymer containing quaternary ammonium compounds prepared from the partial imides.

The ammoniation reaction is accompanied by a temperature rise and proceeds rapidly to 100 percent conversion of the anhydride linkages. If the reaction is conducted with the dry polymer, excess adsorbed ammonia is stripped from the polymer by treating it under reduced pressure to remove the ammonia. If the ammoniation is conducted with a polymer suspension, excess ammonia is removed along with the inert diluent which is stripped off under reduced pressure.

Preparation 5

Preparation of partial dimethylaminopropyl imide, partial butyl imide derivative of crosslinked isobutylene maleic anhydride copolymer Xylene (1 liter) is charged to a reaction vessel equipped with reflux condenser, Dean-Stark water trap and stirrer. methyliminobis-propylamine (1.45 grams) and 1:1 molar copolymer of isobutylenemaleic anhydride (38.5 grams) are added with stirring. The stirred mixture is heated to reflux temperature (140°C.) and is maintained at said temperature for 1 hour. Upon completion of the 1 hour period, dimethylaminopropyl amine (6.38 grams) is added over a three hour period, during which period reflux temperature is maintained. To the resulting reaction mixture is then added butylamine (13.7 grams). Reflux of the reaction mixture is continued for three additional hours. It is then cooled and filtered. The solid product is washed with hexane and dried. The partial dimethylaminopropyl imide, partial butyl imide derivative of crosslinked isobutylene maleic anhydride copolymer is obtained.

Preparation 6

Preparation of partial ester aminoamide, partial dimethylaminopropyl amide, partial dimethylaminopropyl imide derivative of crosslinked ethylene-maleic anhydride copolymer Xylene (1 liter) is charged to a reaction vessel equipped with reflux condenser, Dean-Stark water trap and stirrer. Methylimino-bis-propylamine (2.9 grams) and 1:1 molar copolymer of ethylene-maleic anhydride (63.0 grams) are added with stirring. The stirred mixture is heated to reflux temperature (140°C.) and is maintained at said temperature for 1 hour. Upon completion of the 1 hour period dimethylaminopropyl amine (12.75 grams) is added over a three hour period during which period reflux temperature is maintained. The mixture is cooled to 90°C. and additional dimethylaminopropyl amine (12.75 grams) is added. The temperature is maintained at 90°C. for 3 hours. Butanol (18.5 grams) is then added and the temperature is maintained at 90°C. for an additional 2 hour period. The reaction mixture is then cooled and filtered. The solid product is washed with hexane and dried. The partial ester aminoamide, partial dimethylaminopropyl amide, partial dimethylaminopropyl imide derivative of crosslinked ethylene-maleic anhydride copolymer is obtained.

Preparation 7

Preparation of partial dimethylaminoethyl ester, partial dimethylaminobutyl imide derivative of crosslinked 2-methylpentene -1/maleic anhydride copolymer Xylene (1 liter) is charged to a reaction vessed equipped with reflux condenser, Dean-Stark water trap and stirrer. Methyliminobis-propylamine (2.9 grams) 1:1 copolymer of 2-methylpentene-1/maleic anhydride copolymer (92.0 grams) and diethylaminobutyl amine (7.2 grams) are added with stirring. The stirred mixture is heated to reflux temperature (140°C.) and maintained at said temperature for 1 hour. The mixture is cooled to 100° C and dimethylaminoethanol (45.0 grams) is added. The temperature of the reaction mixture is maintained at 100° C for 5 hours. It is then cooled and filtered. The solid product is washed with hexane and dried. The partial dimethylaminoethyl ester, partial diethylaminobutyl imide derivative of crosslinked 2-methylpentene-1/maleic anhydride copolymer is obtained.

Preparation 8

Preparation of partial dimethylaminopropyl imide derivative of crosslinked ethylene-maleic anhydride copolymer Xylene (1 liter) is charged to a reaction vessel equipped with reflux condenser, Dean-Stark water trap and stirrer. Methylimino-bis-propylamine (2.9 grams), 1:1 molar copolymer of ethylenemaleic anhydride and dimethylaminopropyl amine (5.1 grams) are added with stirring. The stirred mixture is heated to reflux temperature (140° C) and maintained at said temperature for 4 hours. The resulting reaction mixture is cooled and filtered. The solid product is washed with hexane and dried. The partial dimethylaminopropyl imide derivative of crosslinked ethylene-maleic anhydride copolymer is obtained.

Preparation 9

The sodium salt of partial dimethylminopropylimide derivative of crosslinked ethylene-maleic anhydride is produced upon addition of sodium hydroxide to water containing partial dimethylaminopropyl imide derivative of crosslinked ethylene-maleic anhydride.

Preparation 10

The calcium salt of partial dimethylaminopropylimide derivative of crosslinked ethylene-maleic anhydride is produced by adding partial dimethylaminopropylimide derivative of crosslinked ethylene-maleic anhydride to water containing calcium hydroxide.

In the same manner, other PEs utilizable in the present invention may be prepared.

EXAMPLE 1

This example shows the selective removal of polio virus from a virus harvest using crosslinked polyelectrolyte polymers containing the necessary imide groups. The virus harvest was grown in primary green monkey kidney cultures maintained in Melnick's medium B(0.5 percent lactalbumin hydrolystate in Earle's salt solution) without serum. Before treatment with polymer the virus harvest was diluted tenfold with distilled water to render it hypotonic. The undiluted virus harvest was shown by assay to contain $10^8$ PFU/ml of type 1 polio virus.

The procedure employed in the test was carried out as follows:

100 mg of polymer was suspended in 3 ml of virus harvest and the pH of the suspension was adjusted (to 5.5–6.5 with hydrochloric acid or to 7.5–8.5 with sodium hydroxide). The suspension was agitated for approximately 1 hour. The suspension was then centrifuged at 2000 rpm for 5 minutes and the supernatant fluid was discarded. The polymer was then suspended in 0.3 ml of saline solution having a pH of 7.5 and containing as buffering agent tris(hydroxymethyl) amino-methane. The resulting suspension was agitated for about 15 minutes to elute the sorbed virus from the polymer. The polymer was removed from the eluate by centrifugation. The eluate was then assayed for virus. The results of the test are given in Table 2 below.

In each test the eluate is substantially free of non-viral protein (trichloroacetic acid precipitation test). Since the original titer of virus in 3.0 ml of diluted virus harvest was $10^7$ PFU/ml, virus recovered in 0.3 ml of eluate was considered concentrated if titers were in excess of $10^6$ PFU/ml. These concentrations involved the adsorption and elution of virus to the exclusion of non-viral protein. In the tests the polymers of Runs 1–14 were crosslinked with methyliminobispropylamine. The polymers of Runs 15–17 were crosslinked with divinylbenzene. The percent of crosslinking agent is given in the table. A number of the polymers employed contained dimethylaminopropylimide groupings formed by reaction of the polymer with dimethylaminopropylamine. The amount of dimethylaminopropylimide groupings in the polymer is indicated as a percent in the table.

EXAMPLE 2

This example shows the selective removal of polio virus from a virus harvest using a polyelectrolyte polymer of the present invention. The polyelectrolyte polymer employed was a water-insoluble crosslinked copolymer of isobutylene/maleic anhydride in which 5 percent of the anhydride groupings had been converted to imide groupings by reaction with dimethylaminopropylamine. The crosslinking agent was methyliminobispropylamine.

A 100 ml portion of type 1 Mahonay polio virus harvest containing $10^8$ PFU/ml of polio virus was diluted tenfold with distilled water. The pH of the diluted virus harvest was adjusted downward to 5.5 with hydrochloric acid. One gram of polyelectrolyte polymer was added to the diluted harvest and the resulting suspension was stirred for approximately 1 hour to concentrate the virus on the polymer. The polyelectrolyte containing the adsorbed virus was separated from the suspension by centrifugation followed by decantation. The decanted fluid was retained. The adsorbed virus was eluted from the polyelectrolyte polymer with 10 ml of

TABLE 2

| RUN | POLYMER | % CROSSLINKING AGENT | % DIMETHYLAMINO-PROPYLIMIDE GROUPINGS | pH OF HARVEST | MULTIPLICITY CONCENTRATION OF VIRUS |
|---|---|---|---|---|---|
| 1. | Isobutylene/maleic Anhydride Copolymer | 4% | 4* | 5.5 – 6.5 | 6 |
| 2. | Isobutylene/maleic Anhydride Copolymer | 4% | 5 | 5.5 – 6.5 | 10 |
| 3. | Isobutylene/maleic Anhydride Copolymer | 4% | 15 | 5.5 – 6.5 | 10 |
| 4. | Isobutylene/maleic Anhydride Copolymer | 4% | 100 | 7.5 – 8.5 | 8 |
| 5. | Isobutylene/maleic Anhydride Copolymer | 4% | 50 | 7.5 – 8.5 | 2 |
| 6. | 2-Methylpentene-1/Maleic Anhydride Copolymer | 4% | 5 | 5.5 – 6.5 | 3 |
| 7. | 2-Methylpentene-1/maleic Anhydride Copolymer | 4% | 10 | 5.5 – 6.5 | 3 |
| 8. | Ethylene/maleic Anhydride Copolymer | 2% | 2* | 5.5 – 6.5 | 10 |
| 9. | Ethylene/maleic Anhydride Copolymer | 2% | 2* | 7.5 – 8.5 | 10 |
| 10. | Ethylene/maleic Anhydride Copolymer | 2% | 5 | 7.5 – 8.5 | 5 |
| 11. | Ethylene/maleic Anhydride Copolymer | 2% | 15 | 7.5 – 8.5 | 8 |
| 12. | Ethylene/maleic Anhydride Copolymer | 2% | 20 | 7.5 – 8.5 | 10 |
| 13. | Ethylene/maleic Anhydride Copolymer | 2% | 30 | 5.5 – 6.5 | 10 |
| 14. | Styrene/maleic Anhydride Copolymer | 4% | 4* | 7.5 | 8 |
| 15. | Styrene/maleic Anhydride Copolymer | 1% | 5 | 5.5 – 6.5 | 4 |
| 16. | Styrene/maleic Anhydride Copolymer | 1% | 15 | 5.5 – 6.5 | 10 |
| 17. | Styrene/maleic Anhydride Copolymer | 1% | 100 | 7.5 – 8.5 | 2 |

*Methylaminobis (propylimino) linkages.

saline solution buffered with tris(hydroxymethyl) aminomethane. The eluate was shown by assay to contain $10^9$ PFU/ml of polio virus which represents a tenfold concentration over the original virus harvest. The eluate and the retained decanted fluid were each tested for protein (precipitation with trichloroacetic acid). The eluate showed a negative test for non-viral protein while the decanted fluid was found to contain the same amount of non-viral protein as was present in the virus suspension before treatment with the polyelectrolyte.

EXAMPLE 3

The procedure of Example 2 was repeated in all essential details with the exception that 1 ml of saline solution buffered with tris(hydroxymethyl) aminomethane was used to elute the adsorbed virus from the polyelectrolyte instead of 10 ml of buffered saline solution. The eluate was shown by assay to contain $10^{10}$ PFU/ml of polio virus which represents a one-hundredfold concentration over the original virus harvest. The eluate was found to be substantially free of non-viral protein.

EXAMPLE 4

This example shows the selective removal of poliovirus from a viral harvest using a water-insoluble polyelectrolyte polymer containing the necessary imide groups.

Poliovirus was concentrated on and eluted from a polyelectrolyte polymer following the procedure of Example 2 in all essential details. The polymer employed was a crosslinked copolymer of isobutylene/maleic anhydride in which 5 percent of the anhydride groupings had been converted to imide groupings by reaction with dimethylaminopropylamine. The crosslinking agent was methyliminobispropylamine. The resulting eluate was diluted tenfold in distilled water to contain $10^6$ PFU/ml.

The purified virus was injected intraperitoneally into each of four rabbits (weight three-four pounds) in 3 ml doses at weekly intervals for 4 weeks. At the end of the 4 week period, the rabbits were sacrified and the serum obtained by centrifugation. As a control untreated poliovirus harvest containing $10^8$ PFU/ml was injected into each of four rabbits (weight 3–4 pounds) in the dosage and schedule previously described. At the end of the 4 week period, the rabbits were sacrificed and the serum was obtained. Both groups of sera were found to contain the same amounts of antibody to poliovirus. Gel diffusion studies were performed with the serum obtained from animals injected with the purified virus in tests against untreated poliovirus. In the studies only a single precipitin line was formed indicating that the animals had responded only to virus. Studies on serum obtained from the control animals injected with untreated poliovirus showed 6 precipitin lines, indicating that the control animals had responded to the injection by synthesizing six different types of antibody, one being against the virus, and the remaining five against other proteins contained in the untreated poliovirus harvest.

In the same manner other PEs may be used for adsorption of specific virus, for example, mumps, influenza, arbo, measles and herpes, the virus eluted from the PE, the eluted virus incorporated with a pharmaceutically acceptable vaccine diluent, such as saline, and the composition containing the purified virus injected into a living animal body to produce antibody specific to the virus.

EXAMPLE 5

This example shows the selective removal of poliovirus from a viral harvest using a water-insoluble polyelectrolyte polymer containing the necessary imide groups.

Poliovirus (type 1) was concentrated on a polyelectrolyte polymer (without elution of the virus) following the procedure of Example 2 in all essential details. The polymer employed was a crosslinked copolymer of isobutylene/maleic anhydride in which 5 percent of the anhydride groupings had been converted to imide groupings by reaction with dimethylaminopropylamine. The crosslinking agent was methyliminobispropylamine.

The PE-virus complex was intradermally injected into each of 4 rabbits (weight three-four pounds) using a calculated dosage of $10^8$ PFU/ml of poliovirus. As a control untreated poliovirus was intradermally injected into each of four rabbits (weight three-four pounds) using a dosage of $10^8$ PFU/ml. After 4 weeks the animals were bled and the serum was tested for its ability to neutralize poliovirus. Serum from the animals injected with the PE-virus complex neutralized 100 PFU of poliovirus at a dilution of 1:30. In contrast, serum obtained from the control animals did not neutralize 100 PFU of poliovirus at a dilution higher than 1:5. Thus the serum from animals that received the PE-virus complex was sixfold higher in antibody titer than the serum from the control animals. Eight weeks after initial injection, the animals were again bled and the serum tested. Serum from animals receiving the PE-virus complex contained antibodies capable of neutralizing 100 PFU of poliovirus at a serum dilution of 1:35. In contrast, the control animals yielded serum which did not neutralize 100 PFU of poliovirus at a dilution higher than 1:3. Thus the titer of antibody decreased in the control animals while the titer of antibody in animals injected with PE-virus complex slightly increased.

EXAMPLE 6

A series of test runs was conducted to show the selective removal of poliovirus from sewage using a waterinsoluble polyelectrolyte polymer according to the present invention. prior to treatment, the sewage was filtered through a coarse pad to remove solids. The polymer employed was a copolymer of isobutylene/maleic anhydride crosslinked with 4 mole percent of methyliminobispropylamine. In the polymer 5 percent of the anhydride groups has been converted to imide groups by reaction with dimethylaminopropylamine. The test was conducted as follows: The polyelectrolyte polymer was added to one gallon sample of filtered raw sewage having an adjusted pH of 6.0 (adjusted with hydrochloric acid) and containing 250 PFU of added poliovirus. The sewage-polyelectrolyte mixture was stirred for the period of time indicated in Table 3 and the polyelectrolyte was suspended in 3 ml of 10 percent calf fetal serum in pH 8 phosphate buffer and the resulting mixture was agitated on a rotary shaker for 5 minutes to elute the virus from the polyelectrolyte. The results of the test are summarized in Table 3. In each case, the eluate was substantially free of non-viral protein.

TABLE 3

| RUN NO. | MG. OF POLYMER/GALLON OF SEWAGE | HOURS OF TREATMENT | PFU/ML. IN ELUATE |
| --- | --- | --- | --- |
| 1 | 100 | 1 | 110 |
| 2 | 100 | 2 | 125 |
| 3 | 100 | 3 | 196 |
| 4 | 100 | 4 | 210 |
| 5 | 200 | 1 | 147 |
| 6 | 400 | 1 | 220 |
| 7 | 800 | 1 | 234 |

EXAMPLE 7

This example shows the selective removal of virus from sewage by passing aqueous sewage through a thin layer of waterinsoluble, crosslinked copolymer of isobutylene/maleic anhydride containing 5 percent dimethylaminopropylimide groupings.

The thin layer bed of PE used in the example was prepared as follows:

One gram of PE was packed on a 90 mm AP 20 Millipore (TM) coarse fiberglass pad held in a Millipore (TM) filter holder by suspending the PE in 200 ml of water and filtering the suspension through the pad to obtain a PE layer of about 1–1.5 mm in thickness. A 90 mm AP 20 pad was placed on top of the PE layer (to sandwich the PE and prevent its movement into loose suspension when aqueous sewage was passed through it).

A. One end of a piece of tubing was placed in a storage tank which contained aqueous sewage and the other end of the tubing was attached to the inlet of the filter holder in which was positioned the PE bed. The outlet of the filter holder was attached to a vacuum vessel by tubing equipped with a pinch clamp. The pinch clamp was released slowly and one gallon of sewage was drawn from the storage tank through the thin layer bed of PE into the vacuum vessel in approximately 10 minutes. To maintain the pH of the sewage in the range of 5.0–6.0 during the 10 minute period, carbon dioxide was bubbled into the sewage as it passed the inlet tubing as follows: Crushed dry ice (2 pounds) was placed in a sealed pressure vessel equipped with tubing and an 18 gauge needle. The needle was inserted into the inlet tubing and carbon dioxide was thereby bubbled into the sewage. Laboratory tests showed that under these conditions, the sewage attained a pH of approximately 5.5 immediately before contacting the PE. After passage of the sewage through the PE bed, the PE was removed from the pad and suspended in 10 percent calf fetal serum in pH 8 phosphate buffer to elute virus from the PE. It was determined by assay of the eluate that 55 PFU of virus were removed from the gallon of sewage.

The gallon of filtered sewage was then treated as follows: The filtered sewage was mixed with one gram of PE for 1 hour and the PE was removed from the mixture by filtration. The PE was suspended in 10 percent calf fetal serum in pH 8 phosphate buffer to elute adsorbed virus. It was determined by assay of the eluate that 2 PFU of virus were removed from the gallon of filtered sewage.

B. As a control, 1 gallon of sewage from the storage tank referred to in A above was treated as follows: One gram of PE was mixed with the sewage for 1 hour and the PE was removed from the mixture by filtration. The PE was suspended in 10 percent calf fetal serum in pH 8 phosphate buffer to elute adsorbed virus. It was determined by assay of the eluate that 66 PFU of virus were removed from the gallon of sewage.

EXAMPLE 8

One gallon of sewage containing $10^7$ PFU per gallon of poliovirus (7.0 Log 10 PFU) was passed through a thin layer bed (8.0 grams) of crosslinked isobutylene/maleic anhydride copolymer containing 5 percent dimethylaminopropylimide groups following the procedure described in Example 7, at a flow rate of 1 liter per minute. The PE was sandwiched between two 293 mm AP 20 Millipore coarse fiberglass filter pads. The filtered sewage was found to be substantially free of virus. After passage of the sewage through the PE bed, the PE was removed from the filter pad and adsorbed virus was eluted from the PE by adding 200 ml 5 percent calf fetal serum in distilled water (pH 7.5 with sodium hydroxide) and allowing the eluant to soak into the layer before forcing the eluant through the PE layer. The pH of filtrate was readjusted to 7.5 and the filtrate was recirculated three times through the PE layer. The eluate was found to contain 6.8 $Log_{10}$ PFU of virus.

The eluate was mixed with 200 mg of crosslinked ethylene/maleic anhydride copolymer containing 70 percent dimethylaminopropylimide groupings (EMA–70 percent PE) for 1 hour at 25° C and the suspension was centrifuged at 2000 rpm for 5 minutes. The supernatant fluid was removed from the EMA–70 percent PE by decantation. The supernate was found to be substantially free of virus. The separated EMA–70 percent PE was vigorously mixed with 3 ml saline (0.154 molar NaCl) for 15 seconds to elute adsorbed virus. The eluate was separated from the EMA–70 percent PE by centrifugation followed by decantation. The eluate was found to contain 6.8 $Log_{10}$ PFU of virus.

In the same manner, other $PE_s$ may be used for the adsorption of specific virus, the virus eluted and other PE's that effectively adsorb the virus from the eluate employed to adsorb the virus whereafter the virus may be eluted.

EXAMPLE 9

This example shows the effectiveness of the present invention in selectively removing small quantities of virus from sewage. This procedure permits the detection of small quantities of virus in large volumes of sewage.

Numerous one gallon samples of fluid from a stream in suburban Houston, Texas, into which is emptied substantial quantities of effluent from three sewage treatment plants, were collected over a 2-month period. The samples were treated as follows:

400 mg of crosslinked isobutylene/maleic anhydride copolymer containing 5 percent dimethylaminopropylimide groupings were added to 1 gallon of aqueous sewage sample. The pH of the resulting suspension was adjusted to 6.0 and the suspension was stirred for 1 hour. The suspension was filtered through a coarse fiberglass filter pad and the polymer was collected on the pad. The polymer was removed from the pad and sorbed virus was eluted from the polymer by suspending the polymer in 10 percent calf fetal serum in phosphate buffer. Viruses present in the eluate were isolated and identified. Over the two-month period the viruses listed below were isolated and identified.

ISOLATED VIRUSES

| | |
|---|---|
| Poliovirus Type 1 | Echovirus Type 7 |
| Poliovirus Type 2 | Echovirus Type 15 |
| Poliovirus Type 3 | |

EXAMPLE 10

This example shows the use of various eluants in recovering sorbed poliovirus from crosslinked isobutylene/maleic anhydride copolymer containing 5 percent dimethylaminopropylimide groupings. The PE was washed prior to the test with 0.1 N sodium hydroxide.

To 600 mg PE were added 18 ml of undiluted poliovirus (Type 1) harvest (8.1 $Log_{10}$ PFU/ml poliovirus titer). The suspension was adjusted to pH 4.0 with hydrochloric acid and then stirred for 1 hour at 25° C. The suspension was centrifuged at 2000 rpm for 5 minutes and the supernatent fluid was decanted. The decanted supernatant fluid was found to contain <1.0 $Log_{10}$ PFU/ml of poliovirus. The separated PE containing adsorbed virus was resuspended in 18 ml of distilled water and the suspension was thoroughly mixed. The mixed suspension was distributed into each of 6 tubes giving a final concentration of 100 mg Pe per tube containing $3 \times 10^8$ PFU poliovirus adsorbed thereto. Each suspension was centrifuged and the supernatant fluids decanted. The supernatant fluids were pooled. The pooled fluid was found to contain <1.0 $Log_{10}$ PFU/ml of poliovirus. Each of the six samples of PE was treated with a different eluant to elute adsorbed virus using the following procedure:

The PE was suspended in 3 ml of eluant and the suspension was vigorously mixed for a few seconds. The suspension was then centrifuged and the supernatant fluid (eluate) was decanted. The eluate was then assayed for virus. The results are given in Table 4. In each case the eluate was substantially free of non-viral protein.

of TMV/polyelectrolyte of 1.84) in water at 28°–30° C for 1 hour. After filtration, it was determined that no TMV remained in the filtrate, thus 100 percent of the TMV had been adsorbed.

B. In a test conducted under the same conditions as above, the polyelectrolyte and TMV were saken in a 1 percent sodium chloride solution. All other conditions were identical. It was found that the polymer derivative adsorbed 97 percent of the TMV.

C. The polymer derivative containing adsorbed TMV from above was removed from the filter and transferred to a clean vial containing 5 ml of 1 molar sodium chloride solution. The materials were shaken for 1 hour at 28°–30° C and again filtered. It was determined that 52 percent of the adsorbed virus was eluted during this step. Thus, the copolymer derivative can operate to remove contaminants in the presence of inorganic ions, and yet, if desired, the viral contaminants can be removed from the adsorbent by an elution process at high ionic strengths.

D. A sample of the same hydrophilic polyelectrolyte tested in A and B was selected for this test of virus adsorbent power in the presence of foreign (non-viral) protein. A 2 mg sample of the polymeric derivative was shaken with 2.5 mg of TMV and 50 mg bovine serum albumin in 5 ml water for 1 hour at 30° C. The mixture was then filtered, and the filtrate compared in the Spinco Analytical Ultracentrifuge with a sample of TMV treated in the identical manner but without the polyelectrolyte or bovine serum albumin being present. It was determined that approximately 90 percent of the TMV had been adsorbed, based on a comparison of the filtrate with Folins reagent which showed that 90 percent of the bovine serum albumin was still present. This result indicates a selective virus removal from a solution containing 20 times as much foreign protein.

The conversion of anhydride groups to carboxyl groups in the basic imide-containing polymer as by standing, pH adjustment, or use of a base (which converts the carboxyl groups to the salt form) has a definite effect upon the adsorption capacity of the polyelectrolyte. The adsorption capacity is frequently in-

TABLE 4

| RUN NO. | ELUENT | pH OF ELUENT | $LOG_{10}$ VIRUS TITER (PFU/ml) |
|---|---|---|---|
| Control | | | 8.1 |
| 1 | Distilled Water | 6.8 | <2.0 |
| 2 | Saline (0.154 molar) | 6.8 | <2.0 |
| 3 | Phosphate Buffer (0.05 molar) | 8.0 | 7.7 |
| 4 | Borate Buffer (0.05 molar) | 9.0 | 7.9 |
| 5 | 10% Calf Fetal Serum in Saline | 7.5 | 6.5 |
| 6 | 10% Calf Fetal Serum in Phosphate Buffer | 8.0 | 7.9 |

EXAMPLE 11

A sample of styrene-maleic anhydride copolymer prepared in the presence of one-half mole percent of divinylbenzene was converted to the calculated 100 percent imide by heating with excess dimethylaminopropylamine and purified. The tertiary nitrogen atoms in the resulting imide substituent were then converted to quaternary nitrogens with methyl iodide. This hydrophilic polymeric derivative was screened and the product that passed through a 325 mesh screen tested for adsorption activity as follows:

A. A 0.5 mg sample of the polyelectrolyte was shaken with excess tobacco mosaic virus (TMV) (weight ratio creased remarkably by converting anhydride groups to carboxyl or carboxylate salt groups, as will be apparent from the following illustrative examples:

EXAMPLE 12

Concentration of virus by adsorption was effected in the following manner:

One gram of isobutylene/maleic anhydride copolymer containing 5 percent dimethylaminopropylimide groups was washed with 50 ml 0.1 Normal sodium hydroxide for 1 hour on a rotary shaker. This polyelectrolyte was then packed at 2000 rpm for 5 minutes and repeatedly washed (5 times) with 100 ml distilled water to remove residual sodium hydroxide. The suspended polyelectrolyte in distilled water was then distributed into tubes giving a concentration of 100 mg polyelectrolyte per tube. The pH of the suspension was 6.8. The tubes were centrifugated, the water discarded, and the packed polyelectrolyte was treated with 3 ml undiluted poliovirus (Type 1) for 1 hour on a shaking machine at the ph indicated (HCl or NaOH was used to adjust pH levels). After 1 hour mixing, the tubes were centrifugated and the supernates were obtained and assayed for unadsorbed virus. Control virus (polyelectrolyte-free) at the pH levels indicated showed no decrease in infectivity. A duplicate test as described above was performed with polyelectrolyte washed only with distilled water.

The following Table 5 shows the results using the water-washed polyelectrolyte as opposed to the sodium hydroxide washed polyelectrolyte in which numerous anhydride groups have been converted to sodium carboxylate groups.

crosslinked isobutylene/maleic anhydride copolymer containing 5 percent dimethylaminopropylimide groups. The polymer had been treated with sodium hydroxide as in Example 12.

The test procedure was carried out as follows: 20 mg of polymer was added to 10 ml of virus harvest containing 8.0 $Log_{10}$ PFU/ml virus. The pH of the resulting suspension was adjusted downward to 4.0 by addition of hydrochloric acid. The suspension was stirred for 1 hour and then centrifuged at 2000 rpm for 5 minutes. The supernatant fluid was separated from the polymer by decantation. The supernatant fluid was assayed for virus. The results are shown in Table 6. The polymer was mixed with 1 ml of borate buffer (pH 9) for 5 minutes. The mixture was then centrifuged at 2000 rpm and the supernatant fluid (eluate) was decanted. The eluate was assayed for virus. The results are shown in Table 6. In each case the eluate was substantially free of non-viral protein.

TABLE 6

| | | $LOG_{10}$ VIRUS TITER (PFU/ml) | | | |
|---|---|---|---|---|---|
| RUN | CONTROL VIRUS HARVEST | SUPERNATANT FLUID | ELUATE | MULTIPLICITY CONCENTRATION OF VIRUS IN ELUATE | |
| 1 | Poliovirus (type 1) | 7.70 | 2.50 | 8.55 | 7× |
| 2 | Echovirus (type 1) | 7.40 | <2.0 | 8.30 | 8× |
| 3 | Echovirus (type 7) | 8.20 | 4.1 | 9.0 | 4× |
| 4 | Echovirus (type 12) | 6.9 | <2.0 | 7.8 | 8× |
| 5 | Coxsackievirus (A9) | 7.7 | <2.0 | 8.7 | 10× |
| 6 | Coxsackievirus (B3) | 7.6 | <2.0 | 8.6 | 10× |
| 7 | Reovirus (type 1) | 7.5 | 2.9 | 8.3 | 6.3× |
| 8 | Adenovirus (SV15) | 8.10 | 3.90 | 9.00 | 8× |

TABLE 5

FOR WATER-WASHED POLYELECTROLYTES

| PH OF POLIOVIRUS-POLYELECTROLYTE MIXTURE | $LOG_{10}$ POLIOVIRUS TITER (PFU/ml) OF SUPERNATES |
|---|---|
| 3 | 8 |
| 3.5 | 7.8 |
| 4 | 7.6 |
| 4.5 | 7.4 |
| 5 | 7.6 |
| 6 | 7.7 |
| 7 | 8 |
| 8 | 8 |
| 9 | 8 |

FOR NaOH-WASHED POLYELECTROLYTE

| PH OF POLIOVIRUS-POLYELECTROLYTE MIXTURE | $LOG_{10}$ POLIOVIRUS TITER (PFU/ml) OF SUPERNATES |
|---|---|
| 3 | 1 |
| 3.5 | 0 |
| 4 | 0 |
| 4.5 | 1.2 |
| 5 | 6 |
| 6 | 6.8 |
| 7 | 8 |
| 8 | 7.8 |
| 9 | 8 |

EXAMPLE 13

This example shows the separation of various acid resistant viruses from undiluted viral harvests using a polyelectrolyte polymer. The polymer employed was

EXAMPLE 14

This example shows the removal of poliovirus from undiluted viral harvest using crosslinked isobutylene/maleic anhydride copolymer containing 5 percent dimethylaminopropylimide groups. The PE was washed with 0.1 N sodium hydroxide and then washed with distilled water to remove residual sodium hydroxide. A series of tests were conducted in which the amount of PE and the contact time (contact of PE and viral harvest) were varied. The following test procedure was employed.

PE was mixed with 3 ml of undiluted poliovirus harvest and the pH of the suspension was adjusted to 4.0 with hydrochloric acid. The suspension was centrifuged and the supernatant fluid was decanted. The supernatant fluid was assayed for virus. The results are given in Table 7. The amount of PE and the agitation (contact) time are given in the table.

TABLE 7

| | $Log_{10}$ Virus Titer (PFU/ml) of Supernatant Fluids Contacted with PE for the Total Times Indicated | | |
|---|---|---|---|
| Mg PE | 1 Hour | 2 Hours | 4 Hours |
| 100 | <0.0 | <0.0 | <0.0 |
| 20 | 1.8 | <0.0 | <0.0 |
| 4 | 3.7 | 1.6 | <0.0 |
| 0.8 | 5.9 | 2.8 | 1.0 |
| Control | 8.0 | 8.1 | 7.9 |

EXAMPLE 15

This example shows the removal of poliovirus from undiluted viral harvest using crosslinked isobutylene/maleic anhydride copolymer containing 5 percent dimethylaminopropylimide groups. The PE was washed with 0.1 N sodium hydroxide and then washed with distilled water to remove residual sodium hydroxide. A series of tests were conducted in which the temperature of the PE-viral harvest mixture was varied. The following test procedure was employed:

20 mg PE was mixed with 10 ml undiluted poliovirus harvest. The suspension was vigorously agitated for 1 hour. The suspension was centrifuged and supernatant fluid was assayed for virus. The results are given in Table 8. The temperature of the PE-viral harvest suspension is also given in the table.

TABLE 8

| Temperature | $LOG_{10}$ Virus Titer (PFU/ml) of | |
|---|---|---|
| | Control, PE-free Poliovirus | Supernates of PE-Virus Mixtures |
| 4°C | 8.0 | 6.2 |
| 25°C | 8.0 | 3.6 |
| 37°C | 8.1 | 2.1 |

EXAMPLE 16

This example shows the removal of poliovirus from a large volume of undiluted viral harvest using crosslinked isobutylene/maleic anhydride copolymer containing 5 percent dimethylaminopropylimide groups. The PE was washed with 0.1 N sodium hydroxide and then washed with water to remove residual sodium hydroxide. The procedure employed in the test was carried out as follows:

300 mg of PE was mixed with one liter of undiluted viral harvest. The viral harvest contained 8.0 $Log_{10}$ PFU/ml of virus. The pH of the suspension was adjusted to 4.0 with hydrochloric acid and the suspension was stirred for 2 hours at 37° C. The suspension was filtered with stirring through an AP 20 coarse Millipore (TM) fiberglass pad to trap the PE containing adsorbed virus. The filtrate was found to contain 3.7 $Log_{10}$ PFU/ml of poliovirus indicating that more than 99.99 percent of the total viral population was adsorbed to the PE. The PE was removed from the filter pad and suspended in 3 ml of borate buffer. The suspension was vigorously shaken to elute virus from the PE. The suspension was centrifuged at 2000 rpm for 5 minutes and the supernatant fluid (eluate) was decanted. The eluate was found to contain 10.5 $Log_{10}$ PFU/ml of virus. By this procedure, a 300-fold concentration of virus was achieved with essentially 100 percent recovery of virus from the original viral harvest.

EXAMPLE 17

This example shows the removal of poliovirus from undiluted (isotonic) viral harvest and diluted (hypotonic) viral harvest using water-insoluble polyelectrolyte polymers containing the necessary imide groups. The diluted viral harvest was prepared by diluting undiluted viral harvest tenfold with distilled water. The procedure employed in the test was carried out as follows:

100 mg of PE was suspended in 3 ml viral harvest (for diluted viral harvest 30 ml). The suspension was adjusted to pH 4.0 with hydrochloric acid and then agitated for 1 hour at 25° C. The suspension was centrifuged and the supernatant fluid was decanted. The virus content of the supernate was determined. The results are given in Table 9. The PE was vigorously mixed with 3 ml of 10 percent calf fetal serum in saline for approximately 15 minutes to elute adsorbed virus. The mixture was centrifuged and the supernatant fluid (eluate) was decanted. The virus content of the eluate was determined. The virus content of control undiluted viral harvest was 8.0 $Log_{10}$ PFU/ml. The virus content of control diluted viral harvest was 7.1 $Log_{10}$ PFU/ml.

TABLE 9

| PE | % DIMETHYL-AMINOPROPYL-IMIDE GROUPS | $Log_{10}$ Virus Titer (PFU/ml) of Poliovirus | | | |
|---|---|---|---|---|---|
| | | Hypotonic | | Isotonic | |
| | | Supernate | Eluate (*) | Supernate | Eluate (*) (a) |
| Isobutylene/maleic anhydride copolymer | 5 | 5.0 | 8.0 | 7.5 | 7.3 |
| Isobutylene/maleic anhydride copolymer | 10 | 3.2 | 7.1 | 7.5 | 4.1 |
| Isobutylene/maleic anhydride copolymer | 15 | 3.5 | 7.2 | 7.2 | 5.0 |
| Styrene/maleic anhydride copolymer | 10 | 6.5 | 7.1 | 3.1 | 6.1 |
| Styrene/maleic anhydride copolymer | 15 | 5.4 | 6.0 | 7.7 | 2.2 |
| Styrene/maleic anhydride copolymer | 20 | 5.0 | 7.0 | 4.0 | 5.0 |
| Ethylene/maleic anhydride copolymer | 2(b) | 0.0 | 0.0 | 0.0 | 0.0 |
| Ethylene/maleic anhydride copolymer | 5 | 6.8 | 3.1 | 0.0 | 4.2 |
| Ethylene/maleic anhydride copolymer | 10 | 6.2 | 4.1 | 0.0 | 2.2 |
| Ethylene/maleic anhydride copolymer | 15 | 4.8 | 7.0 | 0.0 | 4.3 |
| Ethylene/maleic anhydride copolymer | 20 | 6.7 | 2.9 | 0.0 | 3.1 |
| Ethylene/maleic anhydride copolymer | 30 | 4.9 | 6.7 | 0.0 | 4.6 |
| PE-Free Control | | 7.1 | | 8.0 | |

(*) - adsorbed virus
(a) - 100% elution = $10^{8.1}$ PFU/ml.
(b) - methyliminobis (propylimino) linkages

EXAMPLE 18

This example shows the separation of various viruses from viral harvests diluted with distilled water, the diluted harvests had a virus concentration of approximately 100 PFU/0.1 ml. The PE employed was crosslinked styrene/maleic anhydride containing 100 percent dimethylaminopropylimide groups. The test procedure was carried out as follows:

100 mg of PE was mixed with 3.0 ml of diluted viral harvest. The suspension was stirred for 1 hour at 25° C and then centrifuged at 2000 rpm for 5 minutes. The supernatant fluid was separated from the PE by decantation and then assayed for virus. The results are given in Table 10. The PE containing adsorbed virus was washed 3 times with distilled water. A quantity of 0.05 molar MgSO$_4$ equal to the original fluid volume was added to the PE and the resulting suspension was agitated for one-half hour at 25° C. The suspension was centrifuged at 2000 rpm for 5 minutes and then the supernatant fluid (eluate) was decanted. The eluate was assayed for virus. The results are given in Table 10.

TABLE 10

| | PFU/0.1 ML VIRUS | | |
|---|---|---|---|
| VIRUS | CONTROL ASSAY | SUPERNATE | ELUATE |
| Type 1 Poliovirus Mahoney | 76* | 1 | 70 |
| Type 1 Poliovirus, LSc | 132 | 4 | 117 |
| Echovirus Type 7 | 102 | 3 | 94 |
| Coxsackievirus B3 | 75 | 0 | 61 |
| Coxsackievirus A9 | 92 | 0 | 0 |
| Herpesvirus | 164 | 0 | 0 |
| Vaccinia Virus | 130 | 0 | 0 |
| Vesicular Stomatitus Virus | 92 | 0 | 0 |
| Measles Virus | 41 | 0 | 0 |
| Adenovirus | 175 | 0 | 0 |

*Numerical values expressed in the table are an average number of PFU/0.1 ml.

EXAMPLE 19

This example shows the separation of various viruses from viral harvests diluted with saline. The diluted harvests had a virus concentration of approximately 100 PFU/0.1 ml. The PE employed was crosslinked styrene/maleic anhydride containing 100 percent dimethylaminopropylimide groups. The test procedure was carried out as follows:

100 mg of PE was mixed with 3.0 ml. of diluted viral harvest. The suspension was stirred for 1 hour at 25°C. and then centrifuged at 2000 rpm for 5 minutes. The supernatant fluid was decanted from the PE and then assayed for virus. The results are given in Table 11.

Table 11

| | PFU/0.1 ML VIRUS | |
|---|---|---|
| VIRUS | CONTROL ASSAY | SUPERNATE |
| Type 1 Poliovirus, Mahoney | 76* | 64 |
| Type 1 Poliovirus, LSc | 132 | 110 |
| Echovirus Type 7 | 102 | 99 |
| Coxsackievirus B3 | 75 | 65 |
| Coxsackievirus A9 | 92 | 41 |
| Herpesvirus | 164 | 0 |
| Vaccinia Virus | 130 | 0 |
| Vesicular Stomatitus Virus | 92 | 0 |

Table 11-Continued

| | PFU/0.1 ML VIRUS | |
|---|---|---|
| VIRUS | CONTROL ASSAY | SUPERNATE |
| Measles Virus | 41 | 0 |
| Adenovirus | 175 | 147 |

*Numerical values expressed in the table are an average number of PFU/0.1 ml.

EXAMPLE 20

This example shows the removal of influenza virus (PR8) from diluted viral harvest using water-insoluble polyelectrolyte polymers containing the necessary imide groupings. The viral harvest was diluted 1:30 with distilled water or with 0.154 M saline solution.

A series of tests were conducted using the following procedure: 100 mg of PE was mixed with 3 ml of diluted viral harvest. The suspension was vigorously agitated. The suspension was centrifuged and the supernatant fluid was decanted. The test procedure was repeated using 3 ml samples of viral harvest which were further diluted with 3 ml, 9 ml, 21 ml, 45 ml, and 93 ml respectively of the above diluents. The virus content of the supernatant fluid was determined and the results are given in Table 12. Quantification of virus was by means of hemagglutination test. In the test system approximately $10^{5.5}$ infectious units are required to hemagglutinate the total amount of human erythrocytes present. An approximation of the titer of influenza virus is obtained by multiplying the highest dilution at which hemagglutination occurred by $10^{5.5}$.

Four PEs which were employed above in the treatment of distilled water diluted viral harvests were treated as follows: The PE was washed with 3 ml 10 percent calf fetal serum in pH 9 borate buffer (0.05M) to elute virus from the PE. The virus content of the eluate was determined by the above referred to hemagglutination test. The results are given in Table 12. By this procedure, influenza virus was selectively adsorbed on the PE and then eluted therefrom to obtain influenza virus substantially free of non-viral protein.

TABLE 12

| PE | % DIMETHYL-AMINOPROPYLIMIDE GROUPS | HEMAGGLUTINATION TITER OF SUPERNATES | | | | | |
|---|---|---|---|---|---|---|---|
| | | 3 ml | 6 ml | 12 ml | 24 ml | 48 ml | 96 ml |
| Control | | +/+* | +/+ | +/+ | +/+ | ±/± | –/– |
| Isobutylene/maleic anhydride copolymer | 4(a) | –/– | –/– | –/– | –/– | –/– | –/– |
| Isobutylene/maleic anhydride copolymer | 2 | –/– | –/– | –/– | –/– | –/– | –/– |
| Isobutylene/maleic anhydride copolymer | 10 | –/– | –/– | –/– | –/– | –/– | –/– |

TABLE 12 – Continued

| PE | % DIMETHYL-AMINOPRO-PYLIMIDE GROUPS | HEMAGGLUTINATION TITER OF SUPERNATES | | | | | |
|---|---|---|---|---|---|---|---|
| | | 3 ml | 6 ml | 12 ml | 24 ml | 48 ml | 96 ml |
| Isobutylene/maleic anhydride copolymer | 20 | –/– | –/– | –/– | –/– | –/– | –/– |
| Isobutylene/maleic anhydride copolymer | 30 | ±/± | –/– | –/– | –/– | –/– | –/– |
| 2-methylpentene-1/maleic anhydride copolymer | 4(a) | +/+ | +/+ | +/+ | +/– | –/– | –/– |
| 2-methylpentene-1/maleic anhydride copolymer | 10 | +/± | +/– | +/– | +/– | –/– | –/– |
| 2-methylpentene-1/maleic anhydride copolymer | 20 | –/+ | –/+ | –/± | –/– | –/– | –/– |
| Styrene/maleic anhydride copolymer | 5 | –/– | –/– | –/– | –/– | –/– | –/– |
| Styrene/maleic anhydride copolymer | 10 | –/– | –/– | –/– | –/– | –/– | –/– |
| Styrene/maleic anhydride copolymer | 20 | –/– | –/– | –/– | –/– | –/– | –/– |
| Ethylene/maleic anhydride coplymer | 2(a) | –/– | –/– | –/– | –/– | –/– | –/– |
| Ethylene/maleic anhydride copolymer | 30 | –/– | –/– | –/– | –/– | –/– | –/– |
| Ethylene/maleic anhydride copolymer | 50 | +/– | +/– | ±/– | –/– | –/– | –/– |
| Eluates | | | | | | | |
| Isobutylene/maleic anhydride copolymer | 4(a) | + | ± | – | – | – | – |
| Isobutylene/maleic anhydride copolymer | 5 | + | + | ± | – | – | – |
| Isobutylene/maleic anhydride copolymer | 10 | + | ± | – | – | – | – |
| Isobutylene/maleic anhydride copolymer | 20 | + | + | + | – | – | – |

*Distilled water/saline
(a) methylaminobis(propylimide) groups

EXAMPLE 21

This example shows the selective removal of poliovirus (Type 1) from filtered raw sewage using water-insoluble crosslinked polyelectrolyte polymers containing the necessary imide groups.

The test was conducted as follows: 100 mg of PE was added to 1 liter of filtered raw sewage having an adjusted pH of 5.5. The sewage contained approximately 100 PFU/0.1 ml of added poliovirus. The suspension was stirred for approximately 1 hour and the PE was separated from the sewage by filtration. The sewage (filtrate) was assayed for virus. The results are given in Table 13. The separated PE was suspended in 10 ml of 10 percent calf fetal serum containing as buffer tris(hydroxymethyl) aminomethane to elute the adsorbed virus from the PE. The eluate was filtered and then assayed for virus. The results are given in Table 13.

TABLE 13

| PEs | | % Dimethyl-aminopropyl-imide | % original Virus in Filtrate | % Virus recovered from PE |
|---|---|---|---|---|
| Isobutylene/ maleic anhydride | ) ) ) | 5 10 15 | 2 4 7 | 92 12 20 |
| Styrene/maleic anhydride | ) ) | 10 20 | 15 2 | 30 25 |
| Ethylene/maleic anhydride | ) ) | 5 15 | 75 25 | <1 30 |

EXAMPLE 22

This example shows the selective removal of strains of echovirus from filtered raw sewage using a water-insoluble crosslinked polyelectrolyte polymer of the present invention. The polyelectrolyte was a methyliminobispropylamine crosslinked copolymer of isobutylene/maleic anhydride which contained 5 percent dimethylaminopropylimide groups.

The test was conducted in accordance with the procedure of Example 21. Results of the test are presented in Table 14.

TABLE 14

| Echovirus | % Virus adsorbed | % Virus recovered from PE |
|---|---|---|
| Strain 1 | >80 | >90 |
| 3 | >90 | >90 |
| 9 | 95 | >95 |
| 12 | 90 | >95 |
| 13 | >95 | >95 |
| 26 | >80 | >90 |
| 30 | >95 | >95 |

EXAMPLE 23

This example shows the selective removal of strains of coxsackievirus from filtered raw sewage using a water-insoluble crosslinked polyelectrolyte polymer of the present invention. The polyelectrolyte was a methyliminobispropylamine crosslinked copolymer of isobutylene/maleic anhydride which contained 5 percent dimethylaminopropylimide groups.

The test was conducted in accordance with the procedure of Example 21. The results of the test are presented in Table 15.

TABLE 15

| Coxsackievirus | % Virus adsorbed | % Virus recovered from PE |
|---|---|---|
| Strain B4 | 80 | >90 |
| B5 | 50 | >80 |

EXAMPLE 24

This example shows the removal of poliovirus (Type 1) from virus media using water-insoluble polyelectrolyte polymers containing the necessary imide groups. The media were prepared by diluting poliovirus harvest containing 8 $Log_{10}$ PFU/ml of poliovirus in the diluents shown in Table 16 so that the final virus concentration was 3.5 $Log_{10}$ PFU/ml. The procedure employed in the test was carried out as follows:

100 mg of polyelectrolyte were suspended in 3 ml of medium. The suspension was agitated for approximately 1 hour. The suspension was centrifuged at 2000 rpm for 5 minutes and the supernatant fluid was separated from the PE by decantation. The supernatant fluid was assayed for virus. The results are given in Table 16.

TABLE 16

| Diluent | PERCENT ORIGINAL POLIOVIRUS IN SUPERNATE | |
|---|---|---|
| | Ethylene/maleic anhydride copolymer (70% Dimethylaminopropylimide). | Ethylene/maleic anhydride copolymer (100% Dimethylaminopropylimide). |
| 1. 2% Calf Fetal serum in water | <10% | <10% |
| 2. 0.01% bovine albumin in water | <10% | 63% |
| 3. 0.01% plasminogen in water | <10% | <10% |
| 4. 0.01% glycoprotein in water | <10% | <67% |
| 5. 0.01% gamma globulin in water | <10% | >90% |
| 6. 0.01% alpha globulin in water | <10% | >90% |
| 7. 0.01% beta globulin in water | <10% | 60% |
| 8. 0.01% thrombin in water | <10% | >90% |
| 9. 0.01% prothrombin in water | <10% | 30% |

EXAMPLE 25

This example shows the removal of herpesvirus from undiluted virus harvest using crosslinked polyelectrolyte polymers containing the necessary imide groups. Prior to treatment, each PE was washed with distilled water. The procedure employed in the test was carried out as follows:

100 mg of PE was suspended in 3 ml of virus harvest and the pH of the suspension was adjusted to 6.0. The suspension was agitated for approximately 1 hour. The suspension was centrifuged at 2000 rpm for 5 minutes and the supernatant fluid was decanted. The supernatant fluid was then assayed for virus. The results are given in Table 17.

EXAMPLE 26

In the manner of the preceding examples, the basic polyelectrolytes of Preparations 2, 3, 5, 6, 8, 9 and 10 are employed for the selective removal of virus, e.g., poliovirus, from virus harvests and other aqueous mixtures of virus and non-viral protein, the polymer containing sorbed virus removed from the aqueous mixture, and the sorbed virus eluted from the polymer if desired. Successive sorptions and elutions using different insoluble basic polyelectrolytes and different eluants are also carried out if desired, according to the manner of the preceding examples.

The adsorption of a charged virus or protein specie to a charged insoluble substrate surface through electrostatic interactions between sites of opposite charge is related to the isoelectric pH (IEpH) of both species

TABLE 17

| Polyelectrolyte | % Dimethylaminopropylimide | TOTAL $LOG_{10}$ PFU Virus in Harvest | TOTAL $LOG_{10}$ PFU VIRUS in Supernate |
|---|---|---|---|
| Ethylene maleic anhydride copolymer | 5 | 6.748 | 4.954 |
| | 10 | 6.748 | 4.000 |
| | 15 | 6.748 | 4.000 |
| | 20 | 6.748 | 4.000 |
| | 30 | 6.748 | 4.477 |
| | 50 | 6.748 | None Detectable |
| | 70 | 6.748 | 4.000 |
| | 100 | 6.748 | 4.903 |
| Styrene Maleic anhydride copolymer | *2 | 7.230 | None Detectable |
| | 5 | 7.230 | 3.954 |
| | 10 | 6.748 | 5.230 |
| | 15 | 6.748 | 6.000 |
| | 20 | 6.748 | 5.380 |
| | 30 | 6.748 | None Detectable |
| | 50 | 6.748 | 5.819 |
| | 70 | 6.748 | None Detectable |
| | 100 | 6.748 | None Detectable |
| Isobutylene maleic anhydride copolymer | *4 | 7.230 | 5.431 |
| | 5 | 7.230 | 4.653 |
| | 10 | 7.230 | 5.041 |
| | 15 | 7.230 | 4.968 |
| | 20 | 7.230 | 4.079 |
| | 30 | 6.748 | 6.301 |
| | 50 | 6.748 | 4.778 |
| | 70 | 6.748 | 4.601 |
| | 100 | 6.748 | None Detectable |
| 2-Methyl pentene maleic anhydride copolymer | *4 | 6.748 | No Detectable Removal |
| | 5 | 6.748 | No Detectable Removal |
| | 10 | 6.748 | 6.301 |
| | 15 | 6.748 | 5.301 |
| | 20 | 6.748 | 6.301 |
| | 30 | 6.748 | None Detectable |
| | 50 | 7.230 | None Detectable |
| | 70 | 7.230 | None Detectable |
| | 100 | 7.230 | None Detectable |

*Methyliminobis(propylimide) linkages.

and to the pH of the aqueous medium. The IEpH of any specie is that pH where electrical neutrality (+) to (−) on a number basis exists. At pH values above the IEpH, the individual specie is predominantly negative [more (−) charges than (+) charges] and is thus anionic in nature. Below the IEpH, the reverse is true and the specie is cationic. Electrostatic (ionic) interaction is promoted between species of opposite net charge.

A word of explanation is in order considering a model (an over simplified system) of a polymer containing only one form of acid group (COOH) and one form of base group ($NR_2$) spaced randomly along the backbone chain:

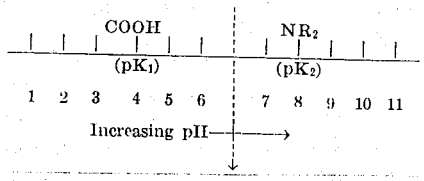

For model (non-polymeric materials) systems, (R)COOH will have a distinct acid strength of $pK_1 = $ pH 4 and the base, (R) $NR_2$, will have a distinct acid strength of $pK_2 = $ pH 8. However, polymeric (R) COOH (polyacid) will not titrate sharply at pH 4 but will exhibit an extended ionization range of perhaps pH 2 through pH 8 with an apparent (average) acid strength (conventionally taken at 50 percent ionization) of $pK_1 = $ pH 4. Similarly, polymeric (R) $NR_2$ (polybase) will not titrate sharply but may exhibit an extended ionization range from pH 6 to pH 9, again averaging at $pK_2$ (base) of pH 8. Finally, when placed upon the same backbone (poly-ampholyte), the ionization ranges of each specie may further change and may in fact overlap, or due to mutual interactions, may shift the model $pK_1$ and $pK_2$ values either up or down the pH scale. These shifts depend upon, among other things:
1. The acid/base, e.g., COOH/$NR_2$, ratio.
2. Specific nature of acid and base, e.g., COOH and $NR_2$, i.e., pK values.
3. Composition of backbone chain.

Such changes or group interactions affecting ionization are very pronounced for synthetic polyelectrolytes (PEs) where large numbers of groups are present with resultant smaller distances between groups. In proteins or virus protein shells the charged groupings are fewer in number and thus farther apart with resulting lower interaction effect. Additionally, proteins are further complicated since acid groups of different pK are present as well as base groups of different $pK_2$.

Referring once more to the model illustration as given above, the $NR_2$ group with apparent $pK_2$ at pH 8 extending from pH 6 to pH 9, means that at all pH values <6, complete protonization of all $NR_2$ groups to the acid form $NR_2H^+$ has occurred, and as pH rises from 6 to 9 increasing numbers of $NR_2H^+$ become deprotonized (50 percent at pH 8) until at pH 9, only uncharged $NR_2$ exists.

The COOH group with apparent $pK_1$ at pH 4, extending from pH 2 to 8, means that at all pH values <2 no ionized carboxyl ($COO^-$) is present and only the undissociated COOH is present. As pH is raised from 2 to 8, increasing amounts of undissociated COOH become ionized (deprotonated) to the base form $COO^-$ with 50 percent being achieved at pH 4 and 100 percent at pH 8.

It is thus clear that the number of (−) and (+) charges present at any given pH can and will vary depending upon:
1. $pK_1$ of acid,
2. ionization range of acid,
3. $pK_2$ of base,
4. ionization range of base,
5. acid/base, e.g., COOH/$NR_2$ ratio,
6. interactions of acid and base, e.g., COOH and $NR_2$, affecting $pK_1$ and $pK_2$ and ionization ranges,
7. types of acid, e.g., COOH, groups present if mixed,
8. types of basic, e.g., $NR_2$, groups present if mixed.

Additionally, media ionic strength and type of extraneous ions will further affect numbers 1, 2, 3, 4 and 6 above. Since IEpH is where numbers of (−) equals (+), then ionic strength changes also will alter IEpH.

Again referring to the above model example, on a mole unit basis having equal numbers of acid and base, e.g., COOH and $NR_2$, per mole, i.e., for example, 50 of each, the $NR_2$ groups by definition exist as 25:25 $NR_2H^+$:$NR_2$ at pH 8, an estimated 40:10 at pH 7 and 50:0 at pH 6. The COOH groups exist as 25:25 $COO^-$:COOH at pH 4, an estimated 40:10 at pH 7 and 50:0 at pH 8. Exact ionization may be determined by electrometric titration. Thus, equal numbers of (+) and (−) exist at pH 7 and this is the IEpH. It follows that below pH 7 the number of (+) groups predominate and the polymer is nominally cationic. However, between pH 2 and 7 negative charges are also present. Above pH 7 the number of (−) groups predominate and the polymer is nominally anionic. However, between pH 7 and 9 positive charges are also present.

Depending on the COOH/$NR_2$ ratio which controls the total available numbers of (+) and (−) charges which can be realized in the system, several parameters change as the pH is varied away from the IEpH.

Net charge or (+) minus (−): At IEpH this is zero or (+)=(−). The farther below the IEpH the greater is the net (+) charge and the farther above the IEpH the greater is the net (−) charge.

Charge distribution: At IEpH this is equal or (+)=(−). Obviously higher percentages of (+) to (−) exist at pHs farthest below IEpH with the reverse true above the IEpH.

Total charge or (+) plus (−): if COOH=$NR_2$ then this is highest at IEpH but this can change variably with the COOH/$NR_2$ ratio in the ampholyte.

Ionic bridging is promoted between species of opposite net charge. However, since all charges are present at certain other pH values, charge distribution and total charge may also variably influence adsorption of oppositely net charged species as media pH varies from IEpH. This is especially so if the materials contain mixed species of acid and basic groups, e.g., COOH or $NR_2$ with widely varying pKs as is true in proteins, etc.

All of the foregoing applies to both synthetic PEs and to proteins or proteinaceous materials such as virus shells, etc., keeping in mind that proteins in general have far fewer acidic or basic components per mole and that these are mixed with respect to specie (pK). These latter properties make the determination of IEpH, charge density, charge distribution, and net charge more difficult for proteins than for synthetic PEs. If the IEpH of both systems is known, specific statements concerning adsorption may be made but as the total system becomes more complex (mixtures of proteins, virus, etc.) only generalizations can be made due to competing and/or interfering effects of the miscellaneous components present.

Adsorption of single specie of known IEpH to PE substrate.

Materials: TMV, IEpH4 Poliovirus, IEpH7.5 Protein, IEpH(3–10) general case Substrate: Series of PE polyampholytes.

1. Determine IEpH for series of PE and construct curve of IEpH vs. PE composition. Nature of media, i.e., water vs. saline (ionic strength) must be kept in mind. Generally IEpH in water is 0.5–1.5 pH units higher than in saline.
2. For each composition the PE will be (−) at pHs higher than IEpH and (+) for pHs lower than IEpH.
3. Draw in the IEpH line for specie to be adsorbed. IEpH should be in same media as use for 1. above.
4. If the TMV, Polio, or protein is (−) at the media pH desired, then only those PEs which are (+) at this same pH will adsorb. Conversely, if the protein is (+) at the desired pH, then only those PEs which are (−) ) at this pH will adsorb.

Examples:

For TMV, IEpH = 4. At all pHs above 4 it is (−) and thus requires a positive PE and only those PEs which are net (+) above 4 will work. The greater the net formal charge difference the better the adsorption so that the formal charge on both species must be considered. At pHs below 4 only those PEs which are net (−) at these pHs will work.

For Polio IEpH=7.5, the same considerations apply and thus the PEs applicable to adsorb polio are different than those for TMV because of the IEpH differences between TMV and Polio.

For conditions close to the IEpH of either specie the net charge is low and thus intermediate adsorptions can be expected.

Care must be taken in interpretation of results since the time of the experiment now enters the picture. For example the quantity of virus adsorbed may very well depend upon contact time and thus an intermediate adsorption may result from low contact time. Secondly, since the PE is an insoluble specie the ionization equilibrium is time dependent, varying between PE systems. Thus if equilibrium is not reached in the time of the experiment, an intermediate or small adsorption may occur.

Due to the fact that both (+) and (−) charges are always present at most desired pHs, it is almost impossible to say that one condition yields zero adsorption vs. another condition giving complete 100% adsorption. Such values can only be determined if the assay method used permits and if all conditions were essentially optimum.

Essentially after choosing the PE from 4. above, one would vary pH, time, ionic strength, and type of extraneous inorganic ions to develop the maximum potential of the particular system.

II. Adsorption of one component preferentially from two specie systems. (Same materials as I. above.)

1. Carry out first three steps in I.
2. Pick a PE which has an isoelectric point intermediate between those of the two adsorbing species and operate at a pH between that of the PE and either specie. The specie with the opposite sign will adsorb preferentially (perhaps quantitatively) to the other.

Example:

Thus for TMV and polio with a PE of IEpH = 5 and operating at pH 6, only polio will adsorb.

Additionally, if a PE is chosen with an IEpH of 8.5, TMV would adsorb perferentially to polio due to the greater net formal charge difference. Some polio may adsorb but now the TMV would be present in greater concentration and, after total elution, a second PE intermediate between TMV and polio may effect a better separation.

Again pH, ionic strength, and type of extraneous ions ($H^+$ vs. $Na^+$, etc.) should be investigated since these parameters will affect the adsorption of species whose IEpH's are close to the operating pH. Furthermore, total charge and charge distribution at the operating pH may become important as will type of charge specie on either the PE of the specie to be adsorbed.

If mixtures adsorb, further separations are achieved by differential elution with elements of increasing ionic strength at a given pH or series of pH's. Thus, fractions more loosely bound (less formal charge difference) will elute first, followed by species which are more tightly bound (greater formal charge difference).

III. More complicated systems.

1. Virus from viral harvest.
2. Virus from sewage.

In these systems the additional quantities and types of non-viral proteins present in the raw mixtures complicate the simple picture (based on IEpH) due to the fact that all additional components have their own particular chemical composition, ionization parameters, and IEpH values. Further, some components may adsorb better through $H^+$ exchange while others appear to proceed best through $Na^+$ exchange. Thus possible pretreatment of PE to yield higher "activity" of the desired kind becomes of importance and must be determined since adsorption of the additional components may interfere with viral adsorption by occupying adsorption sites or by altering the charge on the PE substrate. This is especially true if total net charge is low to begin with.

The two systems as described (pH vs. adsorption) for sewage (optimal pH 5.5–6.0) and from viral harvest (optimal pH at 4) apply here and these pH pictures are explained as being those values where the interfering substances adsorb least, thereby giving a greater number of sites for viral adsorption to occur.

From the foregoing it will be obvious that the selectivity of viral adsorption in the presence of non-viral protein will be affected by the type and quantity of non-viral protein present as well as the pH at which the adsorption is carried out as well as other factors. If the type and quantity of non-viral protein is such that interference with viral adsorption occurs because of attachment to the available sites of the PE, thereby depleting them for virus adsorption, at least under certain conditions, it is apparent that procedural adjustments will have to be made by one skilled in the art to ensure viral adsorption and selective adsorption. Since any non-viral protein which does adsorb to the PE has optimum pH ranges for adsorption, as does the virus desired to be selectively adsorbed, one way of proceeding is to conduct a series of controlled pH experiments, varying the pH but maintaining the same PE adsorbent. In this manner, it can readily be determined at what $pH_s$ and pH ranges the contaminating or undesired non-viral protein do adsorb to the PE, and where they do not so adsorb. Since non-viral protein adsorption involves depletion of available attachment sites which could otherwise be employed for selective attachment of virus, carrying out the adsorption procedure, at those pH ranges where non-viral protein have been shown not to adsorb by such preliminary pilot experiment, results in enhanced and selective adsorption of the desired virus. The practicability of such approach has been demonstrated using the non-viral components of sewage as the contaminating non-viral protein in the study, as clearly shown in the following example.

EXAMPLE 27

A series of runs was conducted as follows, the pH of several 1 liter samples of sewage being adjusted as indicated in Table 18. The sewage contained non-viral protein and had an unadjusted pH of 7.8 100 mg. of polymer were added to each sewage sample and the resulting mixture was stirred for one hour. The polymer was removed from the sewage and washed with water. The polymer was then added to 10 ml. of distilled water having a pH of 6.0 and containing 119 PFU/0.1 ml of polio virus. The resulting mixture was stirred for one hour. The mixture was then centrifuged and the supernatant fluid was decanted. The polymer was then treated with 10 ml. of 10 percent calf fetal serum. The supernatant fluid and the eluate were each assayed for virus. The results are shown in the Table 18. The results indicate that at a pH in the range of about 5.0 to about 6.5 the virus selectively sorbs to the polymer to the substantial exclusion of non-viral protein in the sewage.

TABLE 18

| RUN NO. | pH OF SEWAGE | TOTAL NO.PFU/0.1 ml.POLIOVIRUS IN | |
|---|---|---|---|
| | | Supernate | Eluate |
| 1 | 7.8 (unadjusted) | 112 | 6 |
| 2 | 7.0 | 97 | 11 |
| 3 | 6.5 | 27 | 84 |
| 4 | 6.0 | 0 | 101 |
| 5 | 5.5 | 0 | 98 |
| 6 | 5.0 | 14 | 90 |
| 7 | 4.5 | 68 | 30 |
| 8 | 4.0 | 92 | 4 |

EXAMPLE 28

This example shows the removal of poliovirus from various aqueous media using water-insoluble polyelectrolyte polymers containing the necessary imide groups. The aqueous media were prepared by diluting poliovirus (Type 1) 100,000-fold in distilled water and then tenfold further in the diluents shown in Table 13 so that the final virus concentration was approximately 100–150 PFU/0.1ml. The procedure employed in the test was carried out as follows:

100 mg of PE was suspended in 3 ml of aqueous medium. The suspension was agitated for approximately 1 hour. The suspension was centrifuged at 2,000 rpm for 5 minutes and the supernatant fluid was separated from the PE by decantation. The supernatant fluid was assayed for virus and then rated for virus content using the following rating system:

5 = complete virus adsorption by PE, no PFU detectable in supernatant fluid (adsorption >90%);
4 = 75–90% adsorption of virus;
3 = 50–75% adsorption of virus;
2 = 25% average (10 – 50%) virus adsorption;
1 = <10% adsorption by PE (substantially all virus found in supernatant fluid).

The ratings are given in Table 19.
The percent dimethylaminopropylimide groupings in the polymer is shown in the table. As a control the virus content in diluents which were not treated with PEs averaged 142 PFU/0.1 ml (10 percent +).

Since many embodiments of this invention may be made and since many changes may be made in the embodiments described, the foregoing is to be interpreted as illustrative only, and the invention is defined by the claims appended hereto.

TABLE 19

Total Poliovirus Adsorbed on Polyelectrolytes in the Diluents Indicated

| Maleic anhydride copolymer | Percent imide | Distilled water pH 6.8 [a] | Distilled water pH 8.2 [b] | 0.15M saline pH 6.8 | 0.15M saline pH 8.2 | Earle's saline W/o. $HCO_3^-$ pH 6.8 | Earle's saline W. $HCO_3^-$ pH 8.2 | Phosphate buffer ($NaH_2PO_4$-$Na_2HPO_4$, 0.05M) pH 6.0 | Phosphate buffer pH 7.0 | Phosphate buffer pH 8.0 | 2% fetal serum Water pH 6.8 | 2% fetal serum Saline pH 8.2 |
|---|---|---|---|---|---|---|---|---|---|---|---|---|
| Isobutylene | [c] 4 | c5/7.8 | 5/8.0 | 1/7.5 | 1/8.2 | 3/7.0 | 2/7.8 | 5/6.0 | 1/7.0 | 1/8.0 | 1/7.3 | 1/7.5 |
| | 5 | 5/7.4 | 5/7.4 | 5/6.4 | 1/7.4 | 5/6.4 | 5/7.4 | 5/6.0 | 2/7.0 | 1/8.0 | 1/6.6 | 1/6.4 |
| | 10 | 5/7.4 | 5/8.0 | 4/7.6 | 1/7.8 | 4/7.3 | 4/7.6 | 5/6.0 | 2/7.0 | 1/8.0 | 1/7.4 | 1/7.4 |
| | 15 | 5/7.5 | 5/7.8 | 4/7.8 | 1/7.8 | 3/7.5 | 3/7.8 | 5/6.0 | 1/7.0 | 1/8.0 | 1/7.5 | 1/7.5 |
| | 20 | 5/7.7 | 5/7.8 | 3/8.0 | 1/8.2 | 1/7.8 | 1/8.0 | 3/6.0 | 1/7.0 | 1/8.0 | 1/7.8 | 1/8.0 |
| | 30 | 3/8.0 | 5/8.0 | 1/8.0 | 1/8.0 | 1/8.0 | 1/8.0 | 1/6.0 | 1/7.3 | 1/8.0 | 1/8.0 | 1/8.0 |
| | 50 | 2/8.3 | 4/8.3 | 1/8.6 | 1/8.6 | 1/8.4 | 1/8.4 | 1/6.0 | 1/7.5 | 1/8.6 | 1/8.3 | 1/8.6 |
| | 70 | 1/8.3 | 4/8.4 | 1/8.6 | 1/8.6 | 1/8.5 | 1/8.6 | 1/7.0 | 1/8.0 | 1/8.5 | 1/8.3 | 1/8.6 |
| | 100 | 1/8.4 | 4/8.4 | 1/8.4 | 1/8.4 | 3/8.4 | 1/8.4 | 1/7.5 | 1/8.0 | 1/8.0 | 1/8.0 | 1/8.4 |
| 2-methyl pentene-1 | *4 | 5/5.8 | 1/8.3 | 5/5.8 | 1/8.3 | 5/5.5 | 1/7.8 | 5/5.8 | 3/7.0 | 1/8.0 | 1/5.8 | 1/5.8 |
| | 5 | 4/7.0 | 1/8.5 | 5/7.0 | 1/8.5 | 5/6.0 | 1/7.8 | 5/6.0 | 2/7.0 | 1/8.0 | 1/7.0 | 1/7.0 |
| | 10 | 4/7.0 | 1/8.2 | 4/7.0 | 1/8.2 | 5/6.0 | 1/8.0 | 5/6.0 | 2/7.0 | 1/8.0 | 1/7.0 | 1/7.0 |
| | 15 | 5/6.0 | 1/8.2 | 4/6.5 | 1/8.2 | 5/7.0 | 3/8.0 | 5/6.0 | 3/7.0 | 1/8.0 | 1/6.0 | 1/6.5 |
| | 20 | 5/7.0 | 1/8.2 | 1/7.6 | 1/8.2 | 1/7.0 | 1/7.5 | 5/6.0 | 3/7.0 | 1/8.0 | 1/7.0 | 1/7.5 |
| | 30 | 5/7.5 | 5/8.5 | 1/7.5 | 1/8.5 | 1/7.5 | 1/8.0 | 1/6.0 | 1/7.0 | 1/8.0 | 1/7.5 | 1/8.0 |
| | 50 | 5/7.5 | 5/8.5 | 1/8.5 | 1/8.5 | 1/7.5 | 1/8.1 | 1/6.0 | 1/7.0 | 1/8.0 | 1/7.5 | 1/8.1 |
| | 70 | 5/7.5 | 3/8.5 | 1/8.0 | 1/8.5 | 1/7.5 | 1/8.5 | 1/6.0 | 1/7.0 | 1/8.0 | 1/7.5 | 1/8.3 |
| | 100 | 5/7.5 | 5/9.0 | 1/9.0 | 1/9.0 | 1/7.5 | 1/8.5 | 1/6.0 | 1/7.0 | 1/8.0 | 1/7.5 | 1/8.5 |

TABLE 19 — Continued Total Poliovirus Adsorbed on Polyelectrolytes in the Diluents Indicated

| Maleic anhydride copolymer | Percent imide | Distilled water | | 0.15M saline | | Earle's saline | | Phosphate buffer | | | 2% fetal serum | |
|---|---|---|---|---|---|---|---|---|---|---|---|---|
| | | pH 6.8 [a] | pH 8.2 [b] | pH 6.8 | pH 8.2 | W/o. HCO₃⁻ pH 6.8 | W. HCO₃⁻ pH 8.2 | (NaH₂PO₄-Na₂HPO₄, 0.05M) | | | Water pH 6.8 | Saline pH 8.2 |
| | | | | | | | | pH 6.0 | pH 7.0 | pH 8.0 | | |
| Styrene | *4 | 5/6.5 | 4/8.5 | 5/6.0 | 4/8.4 | | | 5/6.0 | 5/7.0 | 4/8.0 | | |
| | 5 | 5/6.0 | 1/7.5 | 5/5.5 | 1/7.0 | 5/5.5 | 1/7.2 | 5/6.0 | 4/7.0 | 1/8.0 | 1/6.0 | 1/5.5 |
| | 10 | 5/6.0 | 1/7.5 | 5/5.5 | 1/7.0 | 5/5.5 | 1/7.2 | 5/6.0 | 4/7.0 | 1/7.5 | 1/6.0 | 1/5.5 |
| | 15 | 5/6.5 | 5/7.0 | 5/5.5 | 4/6.0 | 5/5.5 | 5/6.0 | 5/5.5 | 5/6.5 | 2/7.0 | 5/6.0 | 1/5.5 |
| | 20 | 5/7.0 | 5/7.5 | 5/5.5 | 3/6.5 | 5/6.0 | 4/7.0 | 5/6.0 | 5/6.5 | 2/7.5 | 3/7.0 | 1/6.0 |
| | 30 | 5/7.5 | 5/7.5 | 5/6.0 | 1/7.0 | 1/6.0 | 1/7.0 | 1/6.0 | 1/7.0 | 1/8.0 | 5/7.5 | 1/6.0 |
| | 50 | 4/7.5 | 5/8.2 | 1/7.2 | 1/8.2 | 1/6.7 | 1/8.0 | 1/6.0 | 1/7.0 | 1/8.0 | 1/7.5 | 1/7.0 |
| | 70 | 5/8.0 | 5/8.5 | 1/8.5 | 1/8.5 | 1/8.0 | 1/7.8 | 1/6.0 | 1/7.0 | 1/8.0 | 1/7.8 | 1/8.5 |
| | 100 | 5/8.0 | 5/9.0 | 1/9.0 | 1/9.6 | 1/8.5 | 1/8.5 | 1/7.0 | 1/8.0 | 1/8.2 | 1/8.0 | 1/9.0 |
| Ethylene | *2 | 5/5.5 | 5/5.5 | 5/5.5 | 5/5.5 | 5/5.5 | 5/5.5 | 5/5.5 | 5/5.5 | 5/6.0 | 1/5.5 | 1/5.5 |
| | 5 | 5/6.3 | 4/6.5 | 5/6.0 | 5/5.9 | 5/6.0 | 5/5.9 | 5/6.0 | 5/6.0 | 5/6.3 | 5/6.3 | 5/6.0 |
| | 10 | 5/6.8 | 5/7.0 | 5/6.5 | 5/6.5 | 5/6.0 | 5/6.0 | 5/6.0 | 4/6.5 | 2/6.8 | 5/6.5 | 1/6.0 |
| | 15 | 5/6.5 | 5/6.5 | 5/6.0 | 5/6.0 | 5/6.0 | 3/6.0 | 5/6.0 | 4/6.5 | 4/6.5 | 5/6.3 | 1/6.0 |
| | 20 | 5/6.5 | 5/6.8 | 5/6.0 | 5/6.0 | 5/6.0 | 5/6.0 | 5/6.0 | 5/6.0 | 5/6.0 | 5/6.0 | 1/6.0 |
| | 30 | 5/7.5 | 3/7.3 | 5/5.5 | 1/6.0 | 5/6.0 | 3/6.3 | 3/6.0 | 1/6.5 | 1/7.0 | 5/7.5 | 1/6.0 |
| | 50 | 5/8.3 | 1/8.3 | 1/7.0 | 1/7.5 | 1/7.0 | 1/7.5 | 1/6.0 | 1/7.0 | 1/7.5 | 5/8.3 | 1/7.0 |
| | 70 | 1/9.0 | 1/9.0 | 1/9.0 | 1/9.0 | 1/9.0 | 1/9.0 | 1/7.0 | 1/8.0 | 1/9.0 | 5/9.0 | 1/9.0 |
| | 100 | 1/9.0 | 1/9.0 | 1/9.0 | 1/9.0 | 1/9.0 | 1/9.0 | 1/9.0 | 1/9.0 | 1/9.0 | 5/9.0 | 1/9.0 |

*Methyliminobis(propylimino) linkages:
 [a] pH of diluent before use.
 [b] pH adjusted to 8.2 with a final concentration of 0.22% NaHCO₃.
 [c] pH of PE-diluent-virus suspension. Values differ from pH of diluent used due to buffering action of added PE.

It is claimed:

1. A method for the production of a virus vaccine comprising the steps of (1) preferentially sorbing a virus from an aqueous mixture of immunizing antigen virus particles and non-viral protein by contacting a water-soluble polyelectrolyte polymer, said polymer being polycationic or polyampholytic in nature, said polymer having a molecular weight of at least 1,000 and being a copolymer of (a) a monoolefin having 2 to 12 carbon atoms and (b) a member selected from the group consisting of maleic acid and maleic anhydride and containing 2–100 percent groups selected from the group consisting of diloweralkyl-aminoloweralkylimide groups and loweralkyliminodi (loweralkylimide) linkages, with the said mixture, with the polymer and pH conditions being such that the polymer has a greater sorptive power for the virus than for the protein, (2) removing the said polymer bearing the sorbed virus from the mixture, (3) eluting the virus from the polymer, and after inactivation of the virus, (4) incorporating the virus of reduced contamination by non-viral protein with a pharmaceutically acceptable vaccine diluent or carrier, to contain an adequate concentration of immunizing antigens.

2. The method of claim 1 wherein (a) is selected from the group consisting of isobutylene, 2-methylpentene-1, styrene and ethylene.

3. The method of claim 1 wherein the polymer contains from 2 to 100% diloweralkylaminoloweralkylimide groups.

4. The method of claim 1 wherein the polymer is isobutylene/maleic anhydride containing about 5 percent dimethylaminopropylimide groups.

5. The method of claim 1 wherein the virus is polio.

6. The method of claim 5 wherein the polymer is isobutylene/maleic anhydride copolymer containing about 5 percent dimethylaminopropylimide groups.

7. The method of claim 1 for the production of a killed virus vaccine wherein incorporation of the virus into the vaccine is preceded by a reaction with an inactivating agent and incubation, the period of incubation being reduced due to the reduced quantity of non-viral protein which is present.

8. The process of claim 1 in which the polymer is utilized under conditions to have a charge opposite to that of the virus.

9. The process of claim 1 in which the polymer has an isoelectric pH between that of the protein and virus, and is utilized in the aqueous mixture at a pH between the isoelectric pH's of the polymer and the virus.

10. The process of claim 9 in which the virus is polio.

11. The method of claim 1 in which the polymer is such and utilized under conditions so as to have a greater net formal charge difference from the virus than from the protein and to be opposite in charge to both.

12. The method of claim 1 wherein the virus is measles.

13. The method of claim 1 wherein the virus is mumps.

14. The method of claim 1 wherein the virus is herpes.

15. The method of claim 1 wherein the virus is influenza.

* * * * *